United States Patent
Dai et al.

(10) Patent No.: US 12,430,060 B2
(45) Date of Patent: Sep. 30, 2025

(54) METHODS AND APPARATUS TO ADAPT MEMORY CHANNEL USAGE ON A PER-USER BASIS

(71) Applicant: Intel Corporation, Santa Clara, CA (US)

(72) Inventors: Jianwei Dai, Portland, OR (US); Virendra Vikramsinh Adsure, Folsom, CA (US); Taeyoung Kim, Fremont, CA (US); Chia-Hung S. Kuo, Folsom, CA (US); Deepak Gandiga Shivakumar, Beaverton, OR (US); Amir Ali Radjai, Portland, OR (US); Deepak Samuel Kirubakaran, Hillsboro, OR (US); Jianfang Zhu, Portland, OR (US); Ivan Chen, Taipei (TW)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/558,353

(22) Filed: Dec. 21, 2021

(65) Prior Publication Data

US 2022/0188016 A1    Jun. 16, 2022

(51) Int. Cl.
G06F 3/06    (2006.01)

(52) U.S. Cl.
CPC .......... *G06F 3/0655* (2013.01); *G06F 3/0625* (2013.01); *G06F 3/0679* (2013.01)

(58) Field of Classification Search
CPC .... G06F 3/0625; G06F 3/0655; G06F 3/0679; G06F 3/061; G06F 3/0635; G06F 3/0688; G06F 30/20; G06N 20/00; Y02D 10/00; G06Q 30/0203; G06Q 30/0281; G06Q 50/08; G06Q 50/10
See application file for complete search history.

(56) References Cited

U.S. PATENT DOCUMENTS

| | | | |
|---|---|---|---|
| 8,107,458 B1 * | 1/2012 | Ranganathan | H04L 45/306 370/254 |
| 9,384,061 B1 * | 7/2016 | Deivanayagam | G06F 9/4881 |
| 2022/0404789 A1 * | 12/2022 | Amaro, Jr. | G05B 19/41845 |

* cited by examiner

*Primary Examiner* — Jane W Benner
(74) *Attorney, Agent, or Firm* — Hanley, Flight and Zimmerman, LLC

(57) ABSTRACT

An example apparatus includes processor circuitry to execute instructions to determine memory usage data associated with a user profile, determine an address hashing policy based on the memory usage data, and determine power states of memory channels based on the address hashing policy.

23 Claims, 18 Drawing Sheets

```
// Resolving hashing policy                                                              ⟵ 502
NumOfChannel=1;
While (1) {
    if (USER.memory_capacity_usage < MemCapPerChannel x NumOfChannel) {                  ⟵ 504
        NumOfChannelReq = NumOfChannel;
        Break;
    }
    HashingPolicyTmp = HashingPolicies(NumOfChannelReq, TargetAddressRange);              ⟵ 506
    if (MaxBandwidth[ResolvedHashingPolicy] > IdentifiedBandwidthRequirement) {          ⟵ 508
        ResolvedHashingPolicy = HashingPolicyTmp;
        ColdChannels = Channels used for address used outside of the target address range;  ⟵ 510
        break;
    }
    else {
        NumOfChannel++                                                                    ⟵ 512
        Continue
    }
}
If (user.PnP_preference == maximal_memory_bandwidth)                                     ⟵ 514
    ResolvedHashingPolicy = default;                                                      ⟵ 516
    ColdChannels = None;
```

METHODS AND APPARATUS TO ADAPT MEMORY CHANNEL USAGE ON A PER-USER BASIS

FIELD OF THE DISCLOSURE

This disclosure relates generally to memory utilization and, more particularly, to methods and apparatus to adapt memory channel usage on a per-user basis.

BACKGROUND

In recent years, computer systems have increased memory sizes through an increased quantity of memory channels. In turn, the increased memory sizes have helped enable the computer systems parallelize memory access via address hashing to obtain a higher memory throughput.

BRIEF DESCRIPTION OF THE DRAWINGS

FIG. 5 illustrates example pseudocode representative of example operations executable by the power state determining circuitry of FIG. 4.

2

Figure 2:
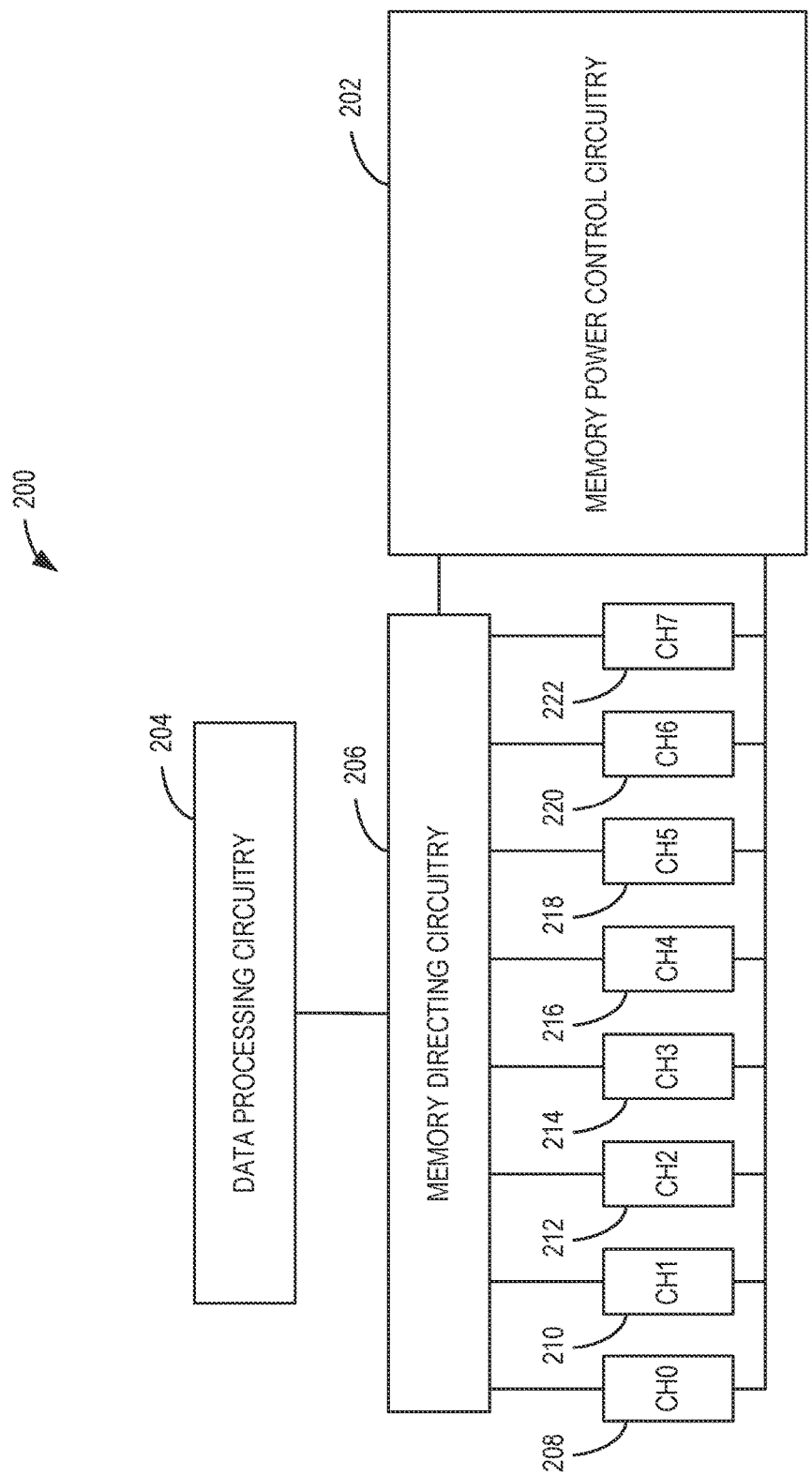
FIG. 2 is a block diagram of an example memory system implemented in accordance with the teachings described herein.
Figure 7:
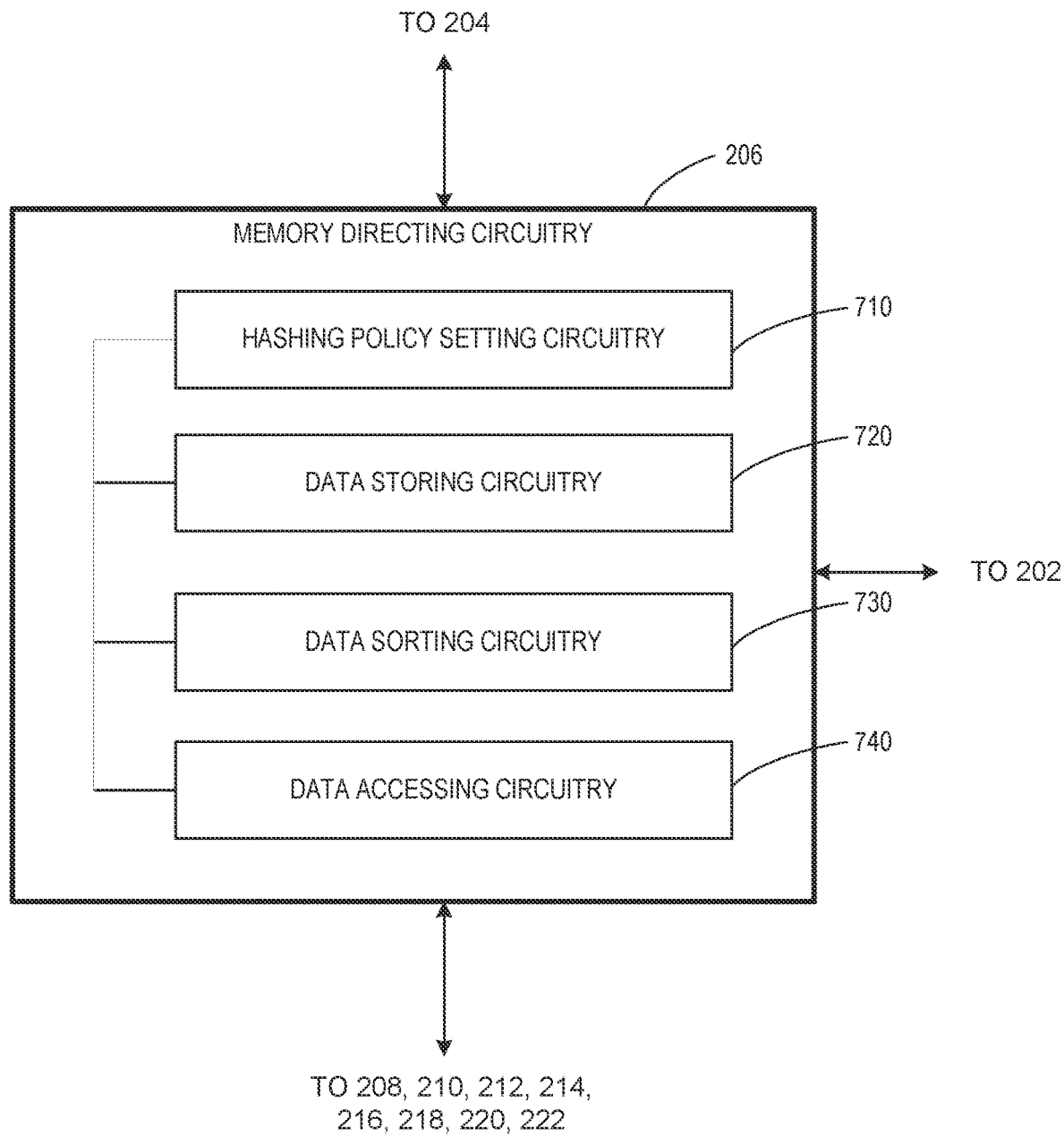
FIG. 7 is a block diagram of example memory directing circuitry of the example memory system of FIG. 2.
Figure 12:
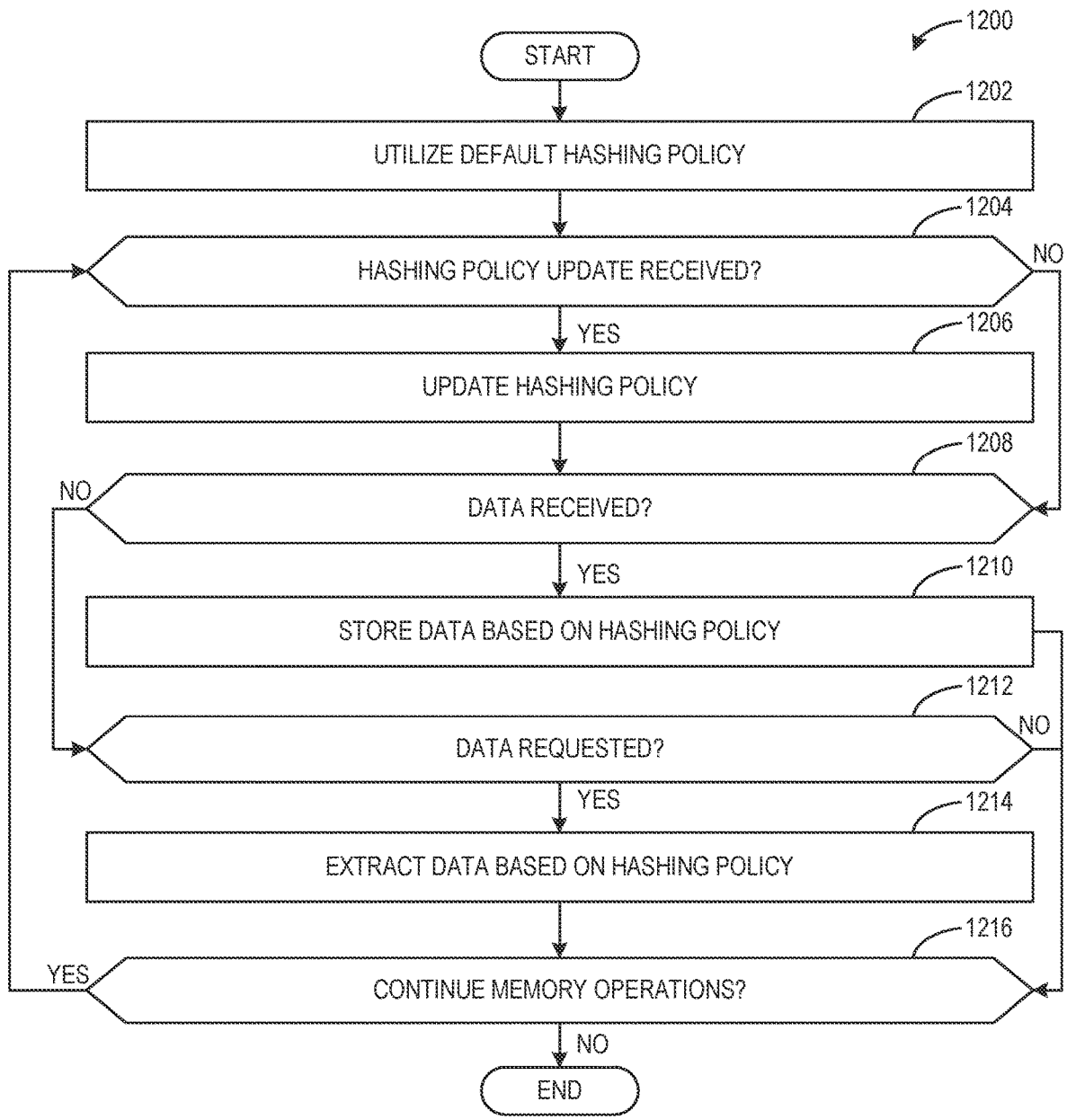
FIG. 12 is a flowchart representative of example machine readable instructions and/or example operations that may be executed by example processor circuitry to implement the example memory directing circuitry of FIGS. 2 and 7.
Figure 14:
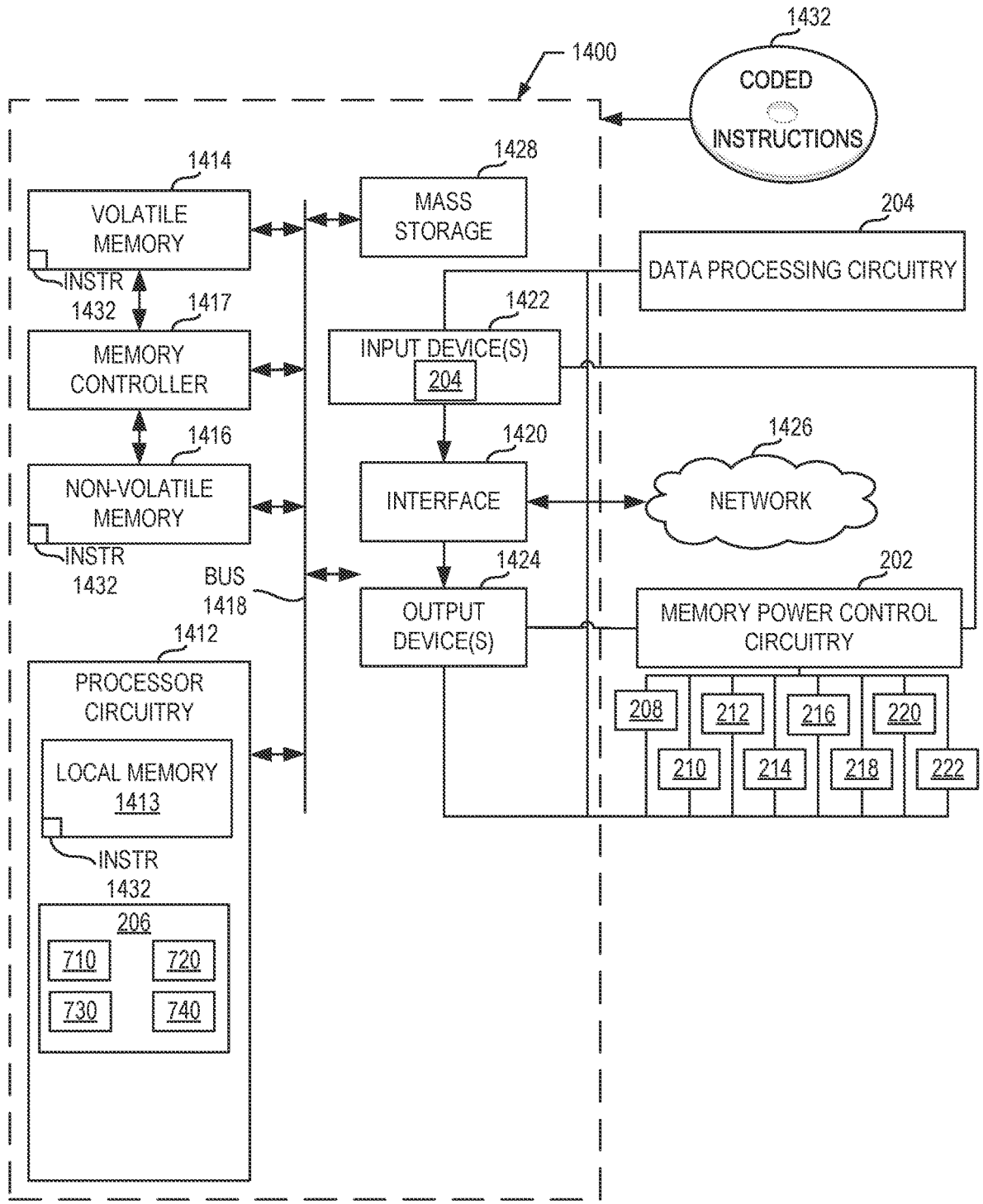

FIG. 14 is a block diagram of an example processing platform including processor circuitry structured to execute the example machine readable instructions and/or the example operations of FIG. 12 to implement the example memory directing circuitry of FIGS. 2 and 7.

Figure 11:
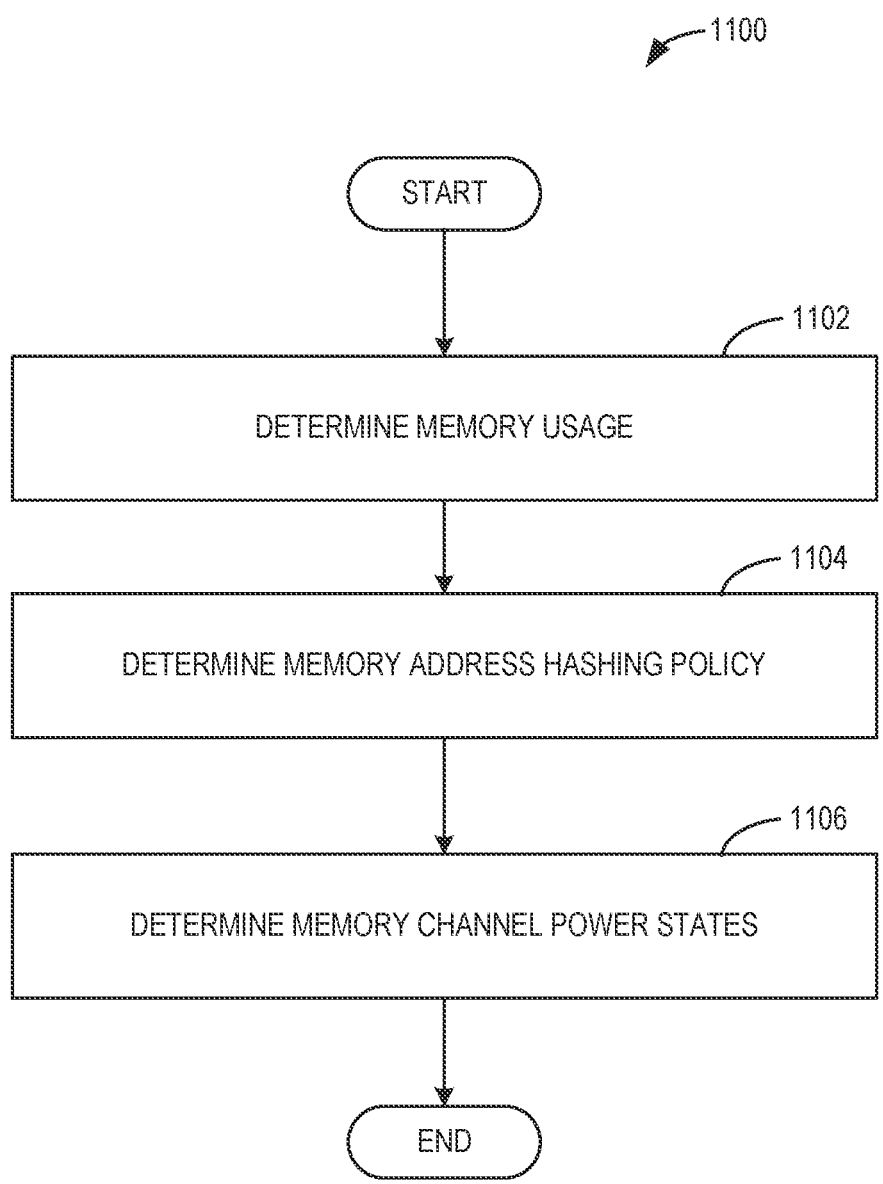
FIG. 11 is a second flowchart representative of example machine readable instructions and/or example operations that may be executed by example processor circuitry to implement the example memory power control circuitry of FIGS. 2 and 3.
Figure 15:
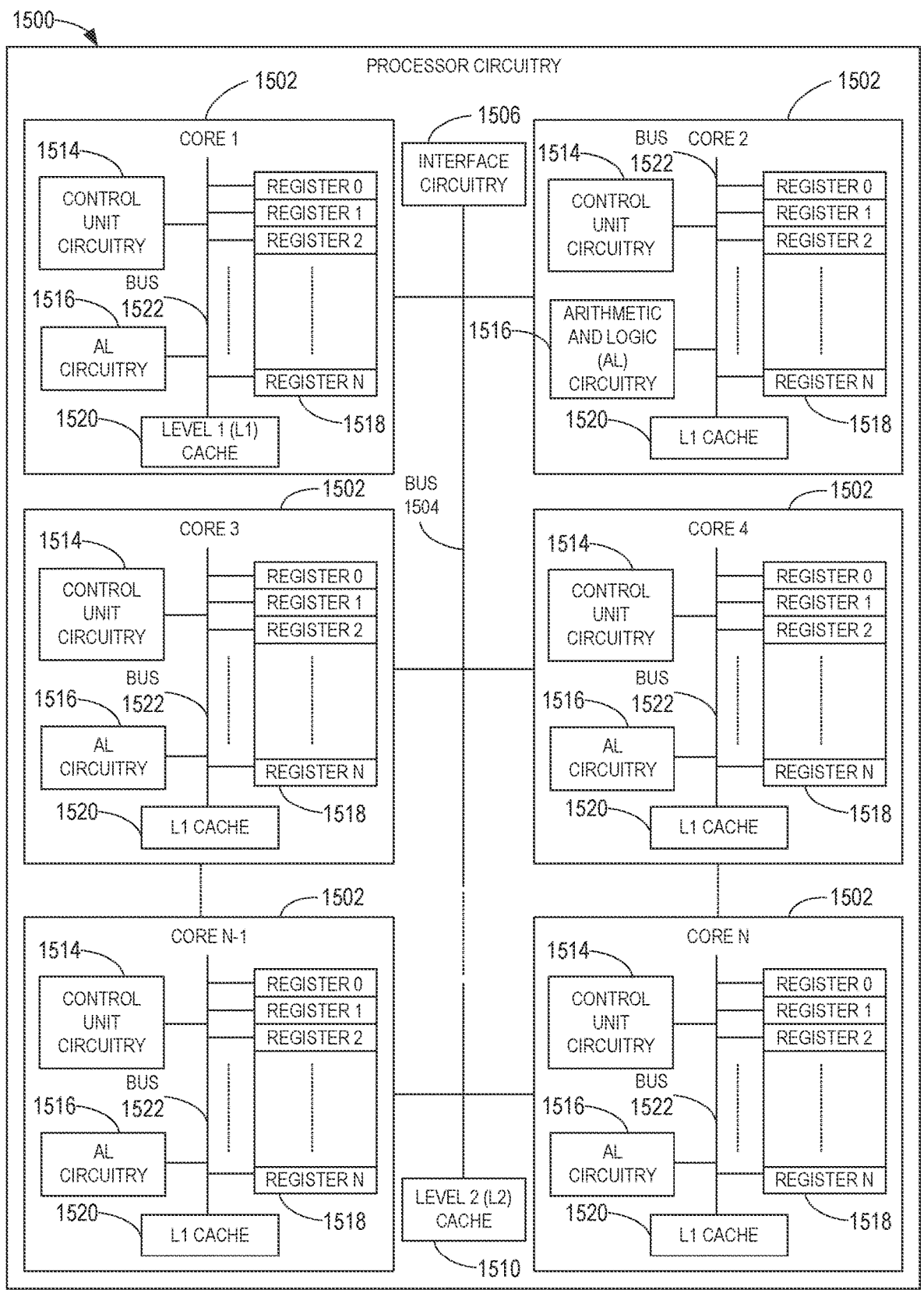

FIG. 15 is a block diagram of an example implementation of the processor circuitry of FIG. 11.

Figure 16:
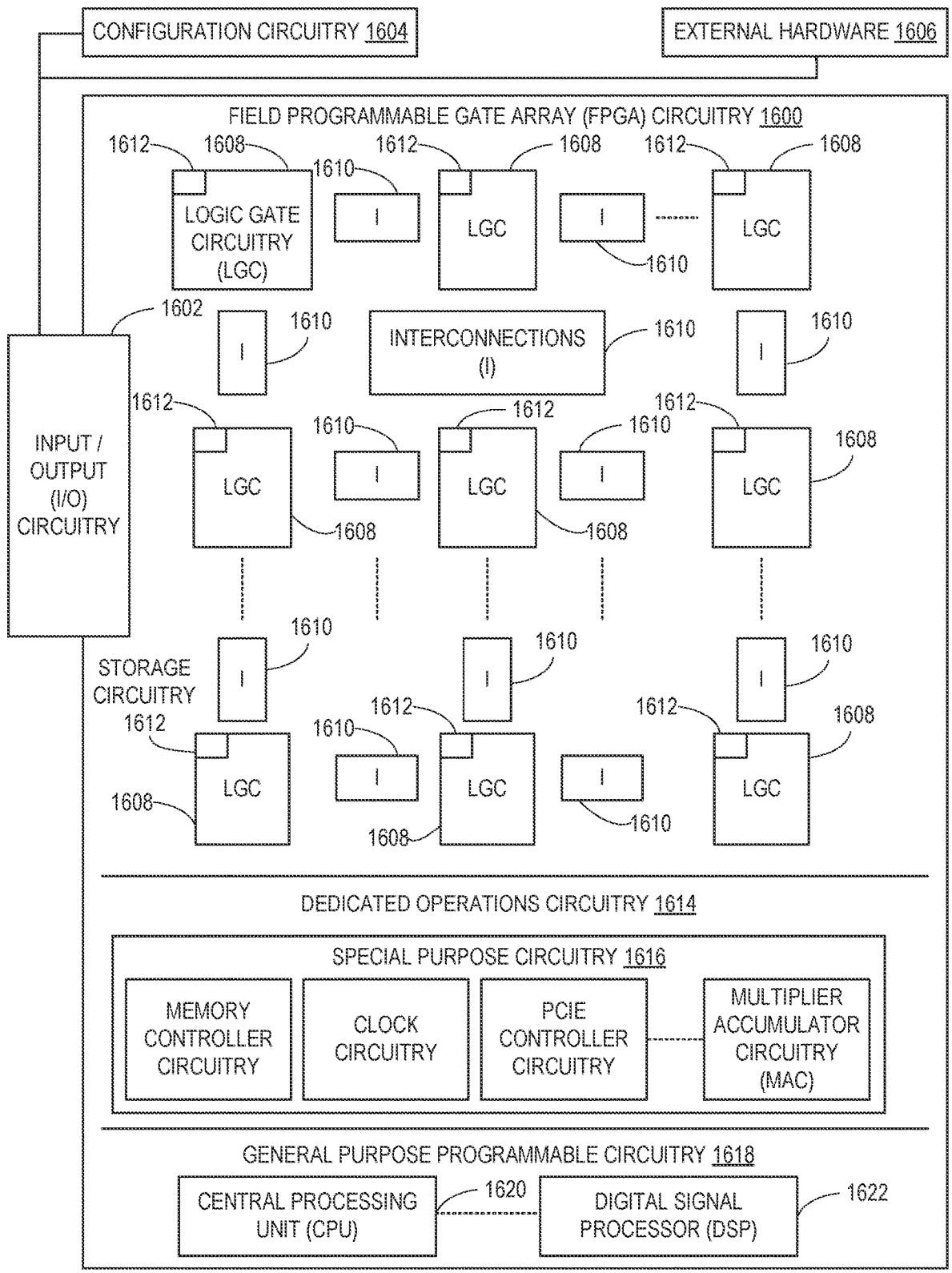

FIG. 16 is a block diagram of another example implementation of the processor circuitry of FIG. 11.

Figure 17:
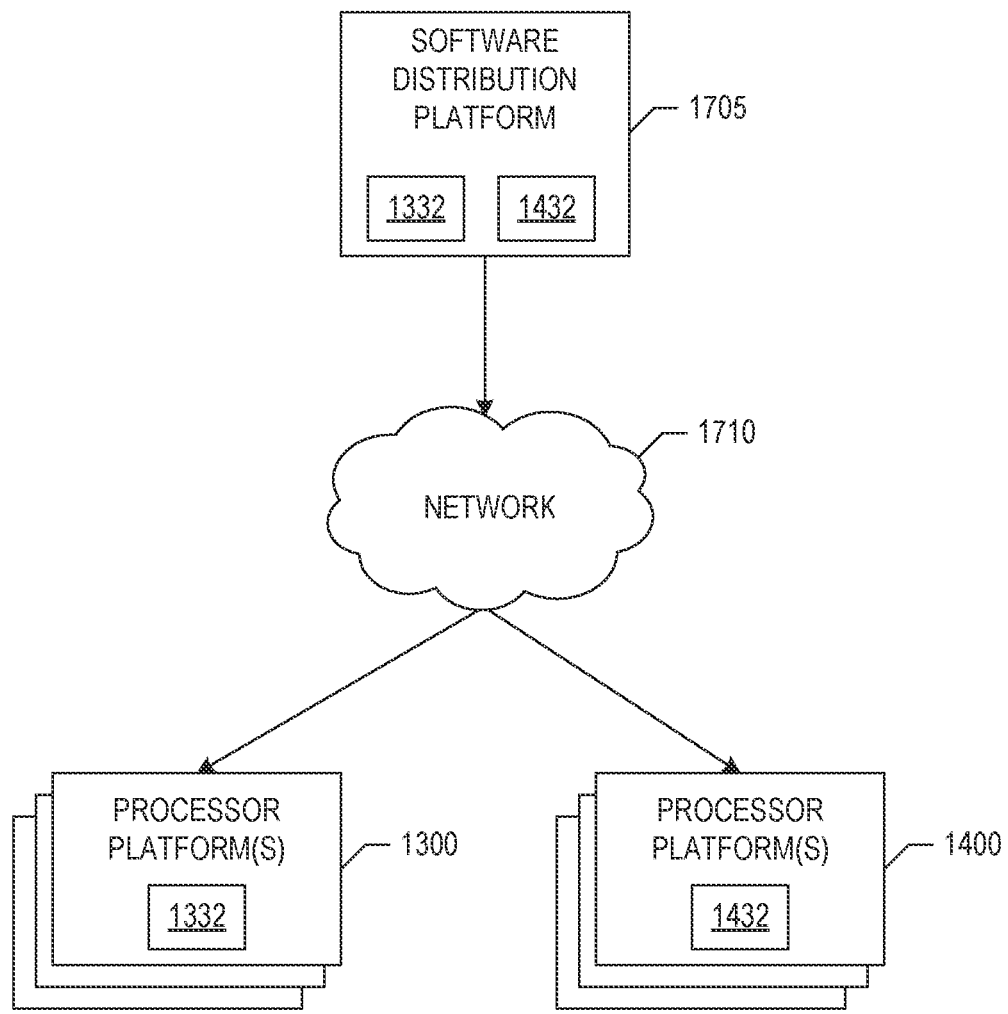

FIG. 17 is a block diagram of an example software distribution platform (e.g., one or more servers) to distribute software (e.g., software corresponding to the example machine readable instructions of FIGS. 8, 9, 10, 11, and/or 12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

Figure 18:
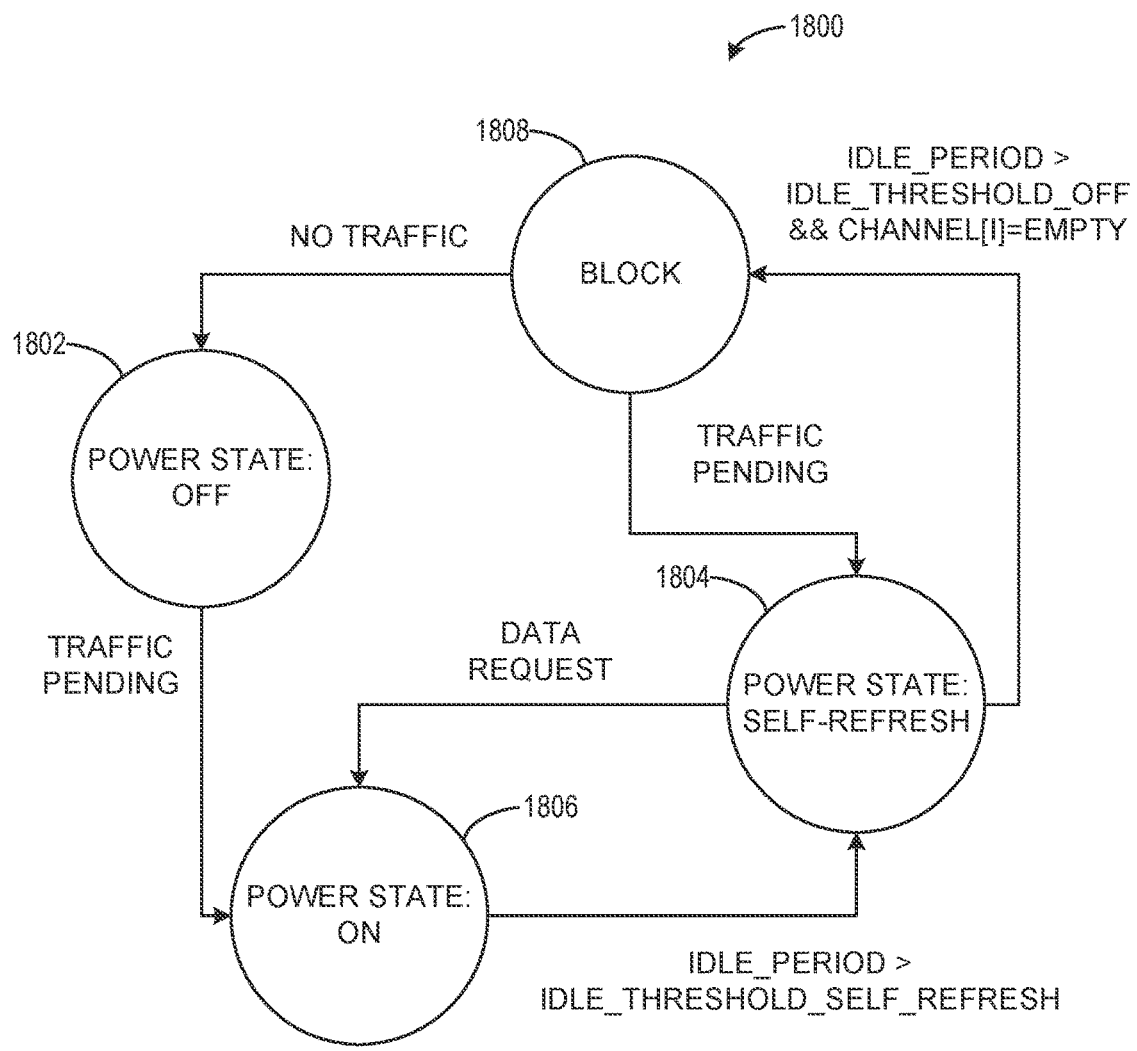

FIG. 18 is an example state diagram representative of memory channel settings configured by the example memory power control circuitry.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In computer systems, more memory can help improve performance. For instance, more memory channels can increase a throughput that the memory can provide and, thus, increase a rate at which the computer system performs tasks. As such, computer systems continue to increase memory capacities and utilize an increased quantity of memory channels for storage. Additionally, manufacturing advancements will likely continue the trend of more memory being installed into systems.

However, increased memory capacities can quickly consume battery life in computing systems. Specifically, each individual memory channel consumes battery at a rate proportional to a storage capacity of the channel. While sacrificing battery life for increased throughput may be beneficial to some users, a portion of the memory capacity often remains unutilized for extended periods of time, as shown in Table 1.

TABLE 1

Per-user memory usage analysis over 3 month period (3 Sigma (99.7%) UB).

| PC Memory Capacity | Total quantity of Users (% of Total Users) | Quantity of users over 3 months that never utilize more than 50% of memory capacity (% of Users) | Quantity of Users over 3 months that never utilize more than 75% of memory capacity (% of Users) |
|---|---|---|---|
| 64 Gigabytes (GB) | 16,165 (0.92%) | 10,486 (64.9%) | 14,183 (87.7%) |
| 32 GB | 15,126 (8.73%) | 58,411 (38.4%) | 125,608 (82.56%) |
| 16 GB | 675,469 (38.8%) | 69,064 (10.2%) | 389,974 (57.7%) |
| 12 GB | 58,086 (3.33%) | 1,802 (3.1%) | 27,065 (46.59%) |
| 8 GB | 717,034 (41.1%) | 4,215 (0.58%) | 133,064 (18.6%) |
| 4 GB | 90,643 (5.20%) | 33 (0.036%) | 1,375 (1.5%) |
| Total | 1,709,523 (100%) | 144,011 (8.40%) | 691,269 (40.4%) |

Overall, 8.40% of users do not utilize more than 50% of the memory capacity in their computer systems and 40.4% of users do not utilize more than 75% of the memory capacity in their computer systems. Additionally, the percentage of unutilized memory capacity generally increases with the size of the memory capacity.

Most day-to-day applications, such as browsing, productivity, and/or office applications, operate using a relatively small amount of memory for many users while other, more niche, applications, such as gaming, are more likely to receive performance benefits from an increased memory capacity. As such, the amount of the memory capacity utilized varies from user to user. However, computer systems are equipped with predefined memory address hashing policies for data storage, which are incapable of adapting to the memory capacity usage of the user.

Examples disclosed herein may be used to improve battery life in a computer system through the control of battery power consumed by individual memory channels. Examples disclosed herein determine an address hashing policy and memory channel power states on a per-user basis. In examples disclosed herein, memory power controlling circuitry collects telemetry data for a user including memory consumption statistics (e.g., memory bandwidth consumption distribution, memory capacity usage, latency sensitivity, etc.), user power and performance preferences, application usage, and a memory topology (e.g., quantity of memory channels, memory capacity, etc.). In examples disclosed herein, the memory power controlling circuitry discovers memory usage data associated with a user profile based on the telemetry data. In examples disclosed herein, the memory usage data can include a memory capacity usage (e.g., a memory space utilization) associated with the user profile, a memory bandwidth usage associated with the user profile, and/or a memory latency sensitivity associated with the user profile. In some examples, the memory usage data includes other statistics corresponding to the memory usage of the user, such as power consumed by the memory at per channel granularity, a user's preference between power and performance, etc.

In examples disclosed herein, the memory capacity usage can correspond to a maximum memory capacity utilized over a predetermined period of time (e.g., 1 month, 2 months, 3 months, etc.). Likewise, the memory bandwidth usage can correspond to a maximum bandwidth pressure encountered over the predetermined period of time. Further, the memory latency sensitivity can correspond to applications utilized by the user profile and an effect of memory latency on the applications. In some examples, the memory power controlling circuitry can identify a frequency and/or duration of outliers in the memory usage data. Accordingly, the memory power controlling circuitry can determine whether the identified outliers should be considered when determining the maximum memory capacity, the maximum bandwidth utilized, and/or the latency sensitivity.

In examples disclosed herein, the memory power controlling circuitry determines thresholds to be associated with different memory address hashing policies based on the memory address hashing policies and the telemetry data. For example, the memory power controlling circuitry can determine memory capacity thresholds to associate with the different memory address hashing policies based on a supported memory capacity associated with the respective memory channels and/or a quantity of the memory channels. Further, the memory power controlling circuitry can determine memory bandwidth thresholds to associate with the different memory address hashing policies based on a maximum bandwidth supported by the memory channels and a quantity of the memory channels. In some examples, the memory power controlling circuitry determines latency thresholds based on a default hashing policy and cut-off points with respect to the memory latency encountered using the default hashing policy. Additionally or alternatively, the latency thresholds can be set through other statistics that affect the encountered memory latency. For example, the memory power controlling circuitry can group different applications and/or categories of applications based on their latency sensitivity. Specifically, an effect of memory latency on a performance of an application varies based on the application and, in turn, the memory power controlling circuitry can determine and/or implement the latency thresholds based on the latency sensitivities associated with different applications. In some examples, the memory power controlling circuitry identifies and analyzes applications and/or categories of applications utilized by the user and, in turn, determines the latency sensitivity associated with the user profile based on the identified applications or categories of applications and respective sensitivities of the applications to memory latency. In some examples, the memory power controlling circuitry determines additional or alternative thresholds associated with other statistics corresponding to the memory usage of the user profile, such as power consumed by the memory at per channel granularity, a user's preference between power and performance, etc.

In examples disclosed herein, the memory power controlling circuitry associates the thresholds with memory address hashing policies. For example, the memory power controlling circuitry can associate a first memory address hashing policy with a first memory capacity threshold, a first memory bandwidth threshold, and/or a first latency threshold, and associate a second memory address hashing policy with a second memory capacity threshold, a second memory bandwidth threshold, and/or a second latency threshold. For instance, the first memory address hashing policy may be less aggressive in distributing consecutive memory access or storage requests across different channels than the second memory address hashing policy to enable certain memory channels to encounter less activity. In turn, the first memory address hashing policy enables the channels that encounter less activity to be configured to operate in a reduced power state to reduce an overall power consumption of the memory channels. Conversely, the second memory address hashing policy may provide a higher throughput than the first memory address hashing policy. Thus, the second memory bandwidth threshold may be greater than the first memory bandwidth threshold. Similarly, given the higher throughput of the second memory address hashing policy, the second memory latency threshold may be less than the first memory latency threshold as the second memory address hashing policy enables data to be retrieved at a faster rate. In some examples, the memory power controlling circuitry maps a first application or group of applications to the first memory address hashing policy and maps a second application or category of applications to the second memory address hashing policy based on the latency sensitivity of the applications. For example, the second memory address hashing policy may be associated with applications that are more sensitive to latency as usage of the second memory address hashing policy enables such applications to encounter a reduced latency. Additionally, the second memory capacity threshold may be greater than the first memory capacity threshold.

In examples disclosed herein, the memory power controlling circuitry determines a memory address hashing policy to be utilized to store data based on the telemetry data and the determined thresholds. In examples disclosed herein, the memory power controlling circuitry can perform a comparison between the memory usage data and one or more of the thresholds associated with the memory address hashing policies. In turn, the memory power controlling circuitry can determine the memory address hashing policy to be implemented based on the comparison. Specifically, the memory power controlling circuitry can determine the memory address hashing policy that meets the memory capacity, bandwidth, and/or latency needs of the user profile. For example, the memory power controlling circuitry can perform a first comparison between the memory capacity usage associated with the user profile and the memory capacity thresholds. In turn, the memory power controlling circuitry can identify one or more of the memory capacity thresholds that the memory capacity usage satisfies (e.g., is less than). Further, the memory power controlling circuitry can perform a second comparison between the memory bandwidth usage associated with the user profile and the memory bandwidth thresholds. In turn, the memory power controlling circuitry can determine one or more of the memory bandwidth thresholds that the memory bandwidth usage satisfies (e.g., is less than). Additionally or alternatively, the memory power controlling circuitry can perform a third comparison between applications associated with the user profile and applications associated with the different hashing policies. In turn, the memory power controlling circuitry can determine the hashing policies that support usage of the applications utilized by the user. In some examples, the memory power controlling circuitry compares the memory usage data to thresholds associated with other statistics corresponding to the memory usage of the user profile, such as power consumed by the memory at per channel granularity, a user's preference between power and performance, etc.

In examples disclosed herein, the memory power controlling circuitry implements an address hashing policy in response to a memory capacity threshold, a memory bandwidth threshold, and/or a memory latency threshold associated with the address hashing policy being satisfied by the memory usage data associated with the user profile. In some examples, the memory power controlling circuitry determines the address hashing policy is eligible for implementation in response to one of the memory capacity threshold, the memory bandwidth threshold, or the memory latency threshold associated therewith being satisfied by the memory usage data associated with the user profile. In some examples, the memory power controlling circuitry determines the address hashing policy is eligible for implementation in response to two of the memory capacity threshold, the memory bandwidth threshold, and/or the memory latency threshold associated therewith being satisfied by the memory usage data associated with the user profile. In some examples, the memory power controlling circuitry determines the address hashing policy is eligible for implementation in response to all of the memory capacity threshold, the memory bandwidth threshold, and the memory latency threshold associated therewith being satisfied by the memory usage data associated with the user profile.

In examples disclosed herein, in response to thresholds associated with different hashing policies being satisfied, the memory power controlling circuitry implements the address hashing policy that is associated with a smallest satisfied memory capacity threshold, a smallest satisfied memory bandwidth threshold, and/or a greatest memory latency threshold satisfied by the memory usage data of the user profile. Accordingly, the implemented address hashing policy corresponds to the address hashing policy that enables power to be utilized most efficiently out of the address hashing policies associated with one or more satisfied threshold(s).

In some examples, as more than one of the address hashing policies may have one or more threshold(s) satisfied by the memory usage data associated with the user profile, the memory power controlling circuitry ranks or sorts the address hashing policies based on a potential power savings associated with the address hashing policies. That is, a first address hashing policy that utilizes one or more of the memory channel(s) less frequently than a second address hashing policy will likely enable increased power savings by enabling the less utilized memory channel(s) to consume less power while operating or consume power less frequently. For example, the first address hashing policy may cause a first memory channel and a second memory channel to be utilized more frequently than a third memory channel, which may enable the third memory channel to be configured to a low-power state. In examples disclosed herein, the memory power controlling circuitry implements the address hashing policy that is associated with the highest ranked power savings in response to one or more of the thresholds associated with the address hashing policy being satisfied by the memory usage data associated with the user profile.

In examples disclosed herein, the memory power controlling circuitry determines power states to be utilized by memory channels based on the memory address hashing policy. In some examples, the power states to be utilized by the memory channels, at least initially, may be predetermined for the respective memory address hashing policies. As such, in response to determining the memory address hashing policy, the memory power controlling circuitry can map the determined memory address hashing policy to an associated power state configuration of the memory channels. The memory power controlling circuitry can cause the memory channels to operate in different power states supported by the memory type, such as a high-power state (e.g., a full-power mode), a first low-power state (e.g., a self-refresh mode, a sleep mode), or a second low-power state (e.g., a power-off mode). For example, when the memory address hashing policy routinely involves usage of the memory channel (e.g., based on the memory usage data associated with the user profile), the memory power controlling circuitry configures the memory channel to the high-power state. Further, when the memory address hashing policy does not routinely involve usage of the memory channel, the memory power controlling circuitry configures the memory channel to the second low-power state. For example, in response to the determined memory address hashing policy not requiring usage of the memory channel, the memory power controlling circuitry configures the memory channel to the second low-power state. In some examples, when the memory address hashing policy requires usage of the memory channel that is less than a threshold frequency (e.g., less than a threshold number of times within a threshold period of time), the memory power controlling circuitry configures the memory channel to the first low-power state. Specifically, the memory power controlling circuitry may associate the first low-power state with a first frequency threshold and the second low-power state with a second frequency threshold that is less than the first frequency threshold. As such, when the determined memory address hashing policy utilizes the memory channel at a frequency that satisfies (e.g., is less than) the second frequency threshold, the memory power controlling circuitry can configure the memory channel to operate in the second low-power state. Further, when the determined memory address hashing policy utilizes the memory channel at a frequency that satisfies the first frequency threshold and does not satisfy (e.g., is greater than) the second frequency threshold, the memory power controlling circuitry can configure the memory channel to operate in the first low-power state. Accordingly, when the memory address hashing policy includes a greater usage frequency for the memory channel, the memory power controlling circuitry enables the memory channel to be switched to the high-power state at a faster rate for quicker utilization.

To enable memory channels that operate in the first or second low-power state to be utilized for data storage and/or retrieval, the memory power controlling circuitry can monitor for traffic to the memory channels. In turn, the memory power controlling circuitry can adjust a memory channel from the first or second low-power state to the high-power state in response to detecting traffic to the memory channel.

In examples disclosed herein, to determine whether the memory channel should be returned to the first or second low-power state, the memory power controlling circuitry can monitor an idle period of the memory channel. That is, in response to the memory channel being unutilized (e.g., not transporting data), the memory power controlling circuitry can measure an idle time of the memory channel. For example, the memory power controlling circuitry can trigger a timer to count down from an idle period threshold (e.g., from 1 second, 30 seconds, 1 minute, etc.) when the memory channel remains unutilized. In response to the idle time of the memory channel satisfying (e.g., being greater than) an idle period threshold, the memory power controlling circuitry can cause the memory channel to return to the first or second low-power state. In some examples, when the memory channel satisfies the idle period threshold while a storage space associated with the memory channel is empty (e.g., not including data), the memory power controlling circuitry adjusts the memory channel to the second low-power state. In some examples, when the memory channel satisfies the idle period threshold while the storage space associated with the memory channel is not empty (e.g., includes data), the memory power controlling circuitry adjusts the memory channel to the first low-power state to enable quicker re-activation of the memory channel. In some examples, the memory power controlling circuitry adjusts the memory channel to the first low-power state in response to a first idle period threshold being satisfied and adjusts the memory channel to the second low-power state in response to a second idle period threshold (e.g., an idle period threshold greater than the first idle period threshold) being satisfied and in response to the memory channel being empty.

The memory power controlling circuitry configures memory address hashing policies and power states of memory channels in a battery-powered computing device based on identified memory usage associated with the computing device. The memory power controlling circuitry configures the memory address hashing policy based on a memory capacity usage, bandwidth usage, application usage, and/or latency sensitivity identified during usage of the computing device. Specifically, the memory power controlling circuitry determines the memory address hashing policy such that a usage of the memory channels corresponds with the identified memory usage. In turn, the memory power controlling circuitry can determine the power states of the memory channels based on the memory address hashing policy. As a result, the memory power controlling circuitry can minimize or otherwise reduce battery power consumed by the memory channels when the computing device does not utilize the memory channels to perform operations corresponding to the identified memory usage. Thus, the memory power controlling circuitry can help prolong battery life of the computing device as much as the usage by the user allows. For instance, when a user utilizes relatively low memory bandwidth applications, such as browsing, communications and/or office applications, in a system with 4-channel memory that can deliver 256 bits per clock cycle, 128 bits of the delivery can be turned-off to reduce an idle power in a memory controller and/or physical layer in the order of 100 milliwatts (mW). Additionally, putting the Dynamic Random Access Memories (DRAMs) associated with the memory channels in the second low-power state (e.g., the power off state) can save approximately 50 mW. Furthermore, such power savings enable a prolonged battery life without compromising performance.

Figure 1:
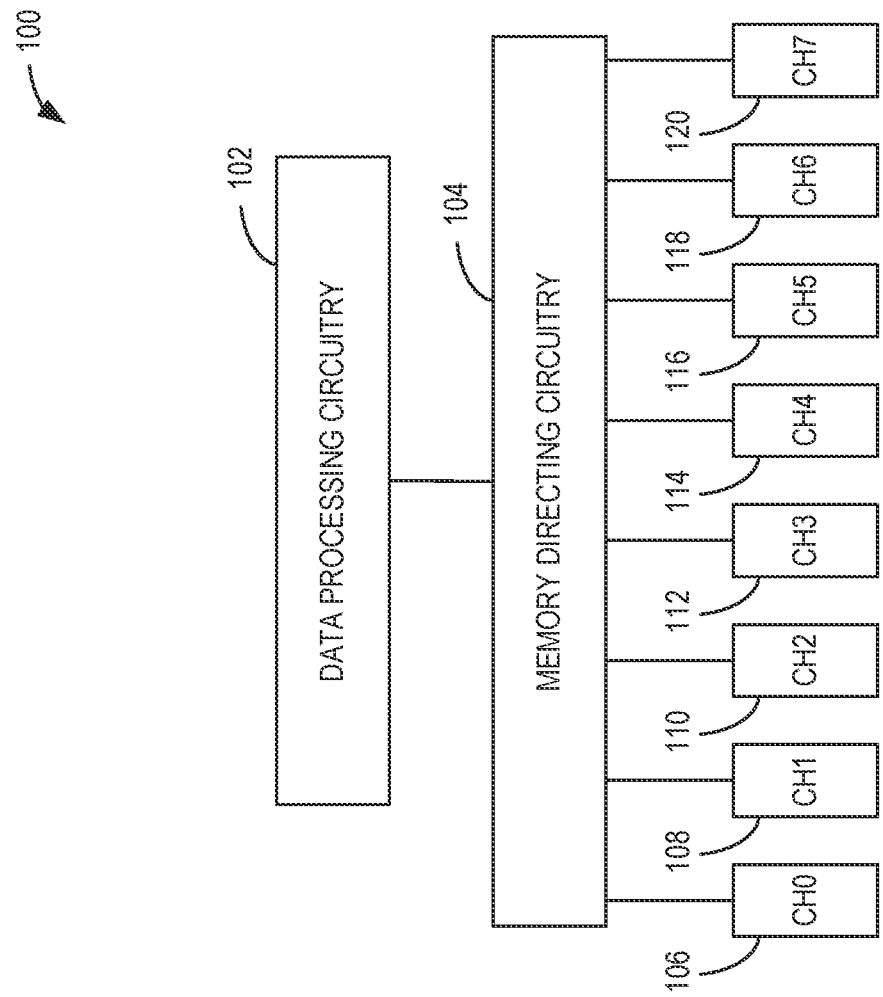
FIG. 1 is a block diagram of a prior art memory system.

FIG. 1 is a block diagram of a prior art memory system 100. In FIG. 1, the memory system 100 includes data processing circuitry 102, memory directing circuitry 104, a first memory channel 106 ("CH0"), a second memory channel 108 ("CH1"), a third memory channel 110 ("CH2"), a fourth memory channel 112 ("CH3"), a fifth memory channel 114 ("CH4"), a sixth memory channel 116 ("CH5"), a seventh memory channel 118 ("CH6"), and an eighth memory channel 120 ("CH7").

In the illustrated example of FIG. 1, the data processing circuitry 102 generates and processes data. For example, the data processing circuitry 102 can determine the data based on operations that an associated user causes the data processing circuitry 102 to execute. Further, the data processing circuitry 102 transmits the data in a storage request to the memory directing circuitry 104. For example, the data processing circuitry 102 can transmit data and an address to the memory directing circuitry 104. Likewise, the example data processing circuitry 102 can send a request for the data to the memory directing circuitry 104.

In the illustrated example of FIG. 1, the memory directing circuitry 104 utilizes a pre-tuned address hashing policy that attempts to utilize a maximal throughput of the memory system 100 by utilizing all of the memory channels 106, 108, 110, 112, 114, 116, 118, 120 to store and/or access data. For example, the memory directing circuitry 104 spreads data access and/or storage requests across the memory channels 106, 108, 110, 112, 114, 116, 118, 120 to enable the data to be stored in, or extracted from, the separate memory channels 106, 108, 110, 112, 114, 116, 118, 120 in parallel.

While utilizing a maximal throughput associated with the memory system 100 can be beneficial for some users, the performance capabilities associated with the maximal throughput may go underutilized and/or unrecognized when a user does not consume a high memory bandwidth. Moreover, the memory channels 106, 108, 110, 112, 114, 116, 118, 120 are powered separately, which can consume a significant portion of the battery power associated with the memory system 100 over time. As such, any user that does not consume a high memory bandwidth is hindered by the utilization of the pre-tuned address hashing policy without receiving a noticeable performance improvement.

FIG. 2 is a block diagram of an example memory system 200 to control memory channel usage for increased power efficiency. The memory system 200 of FIG. 2 may be instantiated by processor circuitry such as a central processing unit executing instructions. Additionally or alternatively, the memory system 200 of FIG. 2 may be instantiated by an ASIC or an FPGA structured to perform operations corresponding to the instructions.

In the illustrated example of FIG. 2, the memory system 200 includes memory power control circuitry 202, data processing circuitry 204, memory directing circuitry 206, a first memory channel 208 ("CH0"), a second memory channel 210 ("CH1"), a third memory channel 212 ("CH2"), a fourth memory channel 214 ("CH3"), a fifth memory channel 216 ("CH4"), a sixth memory channel 218 ("CH5"), a seventh memory channel 220 ("CH6"), and an eighth memory channel 222 ("CH7"). Although the memory system 200 of the illustrated example includes a t-topology having 8 memory channels, the memory power control circuitry 202 can be utilized with any memory topology and any number of memory channels.

In the illustrated example of FIG. 2, the data processing circuitry 204 generates and/or processes data to be stored. In some examples, the data processing circuitry 204 generates and/or processes data based on an activity of a user associated with the memory system. For example, the data processing circuitry 204 can process data from an application utilized by the user. To enable the data to be stored and accessed at a future time, the data processing circuitry 204 transmits the data to, and requests the data from, the memory directing circuitry 206.

In the illustrated example of FIG. 2, to store the received data, the memory directing circuitry 206 directs the data through the memory channels 208, 210, 212, 214, 216, 218, 220, 222. Specifically, the memory directing circuitry 206 utilizes a hashing policy to determine locations (e.g., address locations) where the data is to be stored and, in turn, which of the memory channels 208, 210, 212, 214, 216, 218, 220, 222 is to be utilized. Conversely to the memory directing circuitry 104 of FIG. 1, the memory directing circuitry 206 can dynamically adjust the hashing policy based on the memory usage of the user. For example, the memory directing circuitry 206 can receive a signal from the memory power control circuitry 202 indicative of the hashing policy to be utilized, as discussed in further detail below. In the illustrated example of FIG. 2, the memory directing circuitry 206 receives a signal indicative of the hashing policy to be utilized via the memory power control circuitry 202. In some examples, the memory directing circuitry 206 adjusts the hashing policy in response to receiving the signal indicative of the hashing policy to be utilized. In some examples, the memory directing circuitry 206 adjusts the hashing policy during a reboot operation.

In the illustrated example of FIG. 2, the memory power control circuitry 202 determines telemetries associated with the memory system 200. For example, the memory power control circuitry 202 can determine a memory topology (e.g., a quantity of channels, a total memory capacity, etc.), user power and performance preferences, and/or memory consumption statistics associated with a user of the memory system 200. For example, the memory consumption statistics can include a memory bandwidth consumption distribution, memory capacity usage data, memory channel usage data, application usage data, and/or latency sensitivity data. In turn, the example memory power control circuitry 202 can determine a memory usage corresponding to a user profile (e.g., for a user of the memory system 200) based on the memory consumption statistics. In some examples, the memory usage corresponds to a maximum memory capacity utilized by the user, a maximum bandwidth utilized by the user, and/or applications utilized by the user over a predetermined period of time (e.g., at least 1 week). For example, to determine the memory usage for the user, the memory power control circuitry 202 can determine the maximum memory capacity and/or bandwidth utilized over an initial month of usage of the memory system 200. Additionally, the memory usage can correspond to a maximum latency sensitivity of the applications utilized by the user.

In some examples, the memory power control circuitry 202 identifies outliers in the memory consumption statistics and, in turn, accounts for the outliers in the memory usage determination. For example, the memory power control circuitry 202 can compare a possible maximum memory capacity utilized, a possible maximum bandwidth utilized, an application utilized, and/or a possible maximum memory latency sensitivity encountered, as indicated by the memory consumption statistics, to a duration threshold, a frequency threshold, and/or a deviation threshold (e.g., a deviation between the possible maximum memory bandwidth utilized and a next highest memory bandwidth utilized) to determine the maximum capacity utilized, the maximum bandwidth utilized, the applications utilized, and/or the maximum latency encountered that are to be utilized for a memory address hashing policy determination. Specifically, the memory power control circuitry 202 can determine that the memory usage is to correspond to the possible maximums utilized and/or encountered in response to (i) the possible maximums being encountered for a period of time that satisfies (e.g., is greater than or equal to) the duration threshold, (ii) a difference between the possible maximums and the next highest memory capacity, memory bandwidth, and/or latency sensitivity encountered satisfying (e.g., being less than) a deviation threshold, and/or (iii) the possible maximum, or values within the deviation threshold, being encountered at a frequency that satisfies (e.g., is greater than) the frequency threshold. The duration threshold, the frequency threshold, and/or the deviation threshold may be set or selected by a user and/or a program based on a desired performance (e.g., a memory performance, a processing performance, a power consumption, etc.) to be achieved.

In the illustrated example of FIG. 2, the memory power control circuitry 202 determines whether the user prefers that the memory system 200 operate with efficient power consumption or maximal memory bandwidth. For example, the memory power control circuitry 202 can cause the user to be prompted to indicate a preference during an installation or start-up phase of the memory system 200. In some examples, the prompt provides the user with an option to allow the memory power control circuitry 202 to decide which setting is suitable based on the memory capacity usage of the user. Further, the memory power control circuitry 202 may cause the user to be prompted periodically (e.g., every 6 months) after the user responds to the initial inquiry to ensure that the preferences of the user remain accounted for. Additionally or alternatively, the user may initiate changes to the indicated preference without being prompted, such as through an adjustment of settings associated with the memory system 200.

In the illustrated example of FIG. 2, to determine a memory address hashing policy that corresponds with the memory usage associated with the user profile, the memory power control circuitry 202 can determine thresholds based on a quantity of the memory channels 208, 210, 212, 214, 216, 218, 220, 222, potential memory address hashing policies associated with the quantity of the memory channels 208, 210, 212, 214, 216, 218, 220, 222, and the maximum memory capacity and/or bandwidth supported by the memory channels 208, 210, 212, 214, 216, 218, 220, 222. Additionally or alternatively, the example memory power control circuitry 202 can determine thresholds based on the memory latency sensitivity of different applications and/or categories of applications. For example, the memory power control circuitry 202 can include predetermined memory latency sensitivities for the different applications and/or categories of applications. As such, the example memory power control circuitry 202 can map the different applications and/or categories of applications to suitable memory address hashing policies based on the predetermined memory latency sensitivities associated with the applications. Additionally or alternatively, the example memory power control circuitry 202 can configure latency thresholds based on a default hashing policy utilized by the memory directing circuitry 206. In some examples, the memory power control circuitry 202 determines the different latencies encountered using the default hashing policy are supportable by certain hashing policies and, in turn, the latency thresholds can be set based on the latencies supportable by the different hashing policies.

In the illustrated example of FIG. 2, the memory power control circuitry 202 can associate a first threshold or set of thresholds (e.g., a first capacity threshold, a first bandwidth threshold, and/or a first latency threshold) and/or a first group of applications with a first address hashing policy. In some examples, the first address hashing policy corresponds to data storage and/or retrieval being predominantly handled by certain ones of the memory channels 208, 210, 212, 214, 216, 218, 220, 222. For example, the first address hashing policy can correspond to usage of primarily the first memory channel 208 for data storage and/or retrieval. Accordingly, the memory power control circuitry 202 can configure the first threshold and/or set of thresholds to include a maximum bandwidth and/or capacity supported by the first memory channel 208. In some examples, the memory power control circuitry 202 configures the first threshold and/or set of thresholds to include a minimum latency providable by the first address hashing policy (e.g., through usage of primarily the first memory channel 208) given the application usage associated with the user profile. Further, the memory power control circuitry 202 can determine the first group of applications based on applications having latency sensitivities within a predetermined latency sensitivity range associated with the first address hashing policy.

In the illustrated example of FIG. 2, the memory power control circuitry 202 can associate a second threshold or set of thresholds (e.g., a second capacity threshold, a second bandwidth threshold, and/or a second latency threshold) and/or a second group of applications with a second address hashing policy. For example, the second address hashing policy can correspond to usage of primarily the first memory channel 208 and the second memory channel 210 for the data storage and/or retrieval. Accordingly, the second threshold and/or set of thresholds can include a cumulative sum of the memory capacity and/or bandwidth supported by both the first memory channel 208 and the second memory channel 210. Additionally, the memory power control circuitry 202 can configure the second threshold or set of thresholds to include a minimum latency providable by the second address hashing policy (e.g., through usage of primarily the first memory channel 208 and the second memory channel 210) given the application usage associated with the user profile. Further, the memory power control circuitry 202 can determine the second group of applications based on applications having latency sensitivities within a predetermined latency sensitivity range associated with the second address hashing policy. Similarly, the memory power control circuitry 202 can associate a third threshold or set of thresholds (e.g., a third capacity threshold, a third bandwidth threshold, and/or a third latency threshold) and/or a third group of applications with a third address hashing policy, a fourth threshold or set of thresholds (e.g., a fourth capacity threshold, a fourth bandwidth threshold, and/or a fourth latency threshold) and/or a fourth set of applications with a fourth address hashing policy, a fifth threshold or set of thresholds (e.g., a fifth capacity threshold, a fifth bandwidth threshold, and/or a fifth latency threshold) and/or a fifth set of applications with a fifth address hashing policy, a sixth threshold or set of thresholds (e.g., a sixth capacity threshold, a sixth bandwidth threshold, and/or a sixth latency threshold) and/or a sixth set of applications with a sixth address hashing policy, and/or a seventh threshold or set of thresholds (e.g., a seventh capacity threshold, a seventh bandwidth threshold, and/or seventh latency threshold) and/or a seventh set of applications with a seventh address hashing policy. In some examples, the memory power control circuitry 202 configures a different quantity of thresholds and address hashing policies. In some other memory systems having a different number of memory channels, the memory power control circuitry 202 configures a different quantity of thresholds based on a quantity of memory channels in the system.

In the illustrated example of FIG. 2, the memory power control circuitry 202 determines the memory address hashing policy to utilize based on the memory usage associated with the user profile. That is, when the user indicates that power efficiency is preferred and/or enables the memory system to determine whether to operate with power efficiency or maximal throughput, the example memory power control circuitry 202 can determine the memory address hashing policy to be utilized based on the memory usage associated with the user profile and the thresholds and/or applications associated with the memory address hashing policies. For example, the memory power control circuitry 202 can perform a comparison between the memory usage associated with the user profile and the thresholds and/or applications associated with the address hashing policies. Accordingly, the memory power control circuitry 202 can determine which memory address hashing policy to utilize based on the comparison. In turn, the example memory power control circuitry 202 can transmit a signal indicative of the determined memory address hashing policy to the memory directing circuitry 206.

In some examples, the memory power control circuitry 202 determines the memory address hashing policy can be implemented in response to the memory usage associated with the user profile including a maximum memory capacity that satisfies (e.g., is less than) the capacity threshold associated with the memory address hashing policy. In some examples, the memory power control circuitry 202 determines the memory address hashing policy can be implemented in response to the memory usage associated with the user profile including a maximum bandwidth that satisfies (e.g., is less than) the bandwidth threshold associated with the memory address hashing policy. In some examples, the memory power control circuitry 202 determines the memory address hashing policy can be implemented in response to the memory usage associated with the user profile including usage of applications and/or categories of applications associated with the memory address hashing policy. Additionally or alternatively, the memory power control circuitry 202 can determine the memory address hashing policy can be implemented in response to the memory usage associated with the user profile including a maximum encountered latency that satisfies (e.g., is less than) the latency threshold associated with the memory address hashing policy.

In some examples, the memory power control circuitry 202 determines the memory address hashing policy associated with the smallest capacity threshold satisfied, the smallest bandwidth threshold satisfied, and/or the largest latency threshold satisfied is to be implemented. In some examples, the memory power control circuitry 202 determines the memory address hashing policy associated with applications that most closely match the applications utilized by the user is to be implemented. In some examples, the memory power control circuitry 202 pre-ranks the memory address hashing policies based on potential power savings associated with the respective memory address hashing policies. In turn, the memory power control circuitry 202 can determine the memory address hashing policy is to be implemented in response to the memory address hashing policy being associated with the greatest potential power savings of the memory address hashing policies having the associated capacity, bandwidth, and/or the latency thresholds satisfied by the memory usage associated with the user profile. In some examples, the memory power control circuitry 202 determines the memory address hashing policy is to be implemented in response to the memory address hashing policy being associated with the greatest potential power savings (e.g., the lowest power consumption) and being mapped to applications or categories of applications associated with the user profile.

In the illustrated example of FIG. 2, the memory power control circuitry 202 determines power states, such as a high-power state (e.g., a full-power mode), a first low-power state (e.g., a self-refresh mode, a sleep mode), or a second low-power state (e.g., a power-off mode), for the respective memory channels 208, 210, 212, 214, 216, 218, 220, 222 based on the determined memory address hashing policy to be utilized. For example, the memory power control circuitry 202 can determine the power states of the respective memory channels 208, 210, 212, 214, 216, 218, 220, 222 to associate with the respective memory address hashing policies based on a usage frequency of the respective memory channels 208, 210, 212, 214, 216, 218, 220, 222 when the respective memory address hashing policies are utilized. Specifically, when the memory address hashing policy does not frequently utilize (e.g., every clock cycle) the second memory channel 210, the third memory channel 212, the fourth memory channel 214, the fifth memory channel 216, the sixth memory channel 218, the seventh memory channel 220, and/or the eighth memory channel 222, then the memory power control circuitry 202 can configure the second memory channel 210, the third memory channel 212, the fourth memory channel 214, the fifth memory channel 216, the sixth memory channel 218, the seventh memory channel 220, and/or the eighth memory channel 222 to operate in the first or second low-power state. In response to the memory address hashing policy being implemented, the example memory power control circuitry 202 can adjust the power states of one or more of the memory channels 208, 210, 212, 214, 216, 218, 220, 222. As such, power that was being provided to the second memory channel 210, the third memory channel 212, the fourth memory channel 214, the fifth memory channel 216, the sixth memory channel 218, the seventh memory channel 220, and/or the eighth memory channel 222 can be saved and/or transmitted elsewhere to prolong battery life.

In some examples, the memory power control circuitry 202 compares the usage frequency of the memory channels 208, 210, 212, 214, 216, 218, 220, 222, given the determined memory address hashing policy, to a first usage threshold associated with the first low-power state and a second usage threshold associated with the second low-power state. For example, the first usage threshold can correspond to usage of the memory channel every clock cycle and the second usage threshold can correspond to usage of the memory channel every second. Accordingly, the second usage threshold is greater than the first usage threshold. As such, when the usage frequency of the respective memory channel 210, 212, 214, 216, 218, 220, 222, given the determined memory address hashing policy, satisfies (e.g., is less than) the second usage threshold, the memory power control circuitry 202 can cause the respective memory channel 210, 212, 214, 216, 218, 220, 222 to operate in the second low-power state. Further, when the usage frequency of the respective memory channel 210, 212, 214, 216, 218, 220, 222 satisfies (e.g., is less than) the first usage threshold and does not satisfy (e.g., is greater than) the second usage threshold, the memory power control circuitry 202 can cause the respective memory channel 210, 212, 214, 216, 218, 220, 222 to operate in the first low-power state. As such, the example memory power control circuitry 202 enables the respective memory channel 210, 212, 214, 216, 218, 220, 222 to be woken up and utilized at a faster rate compared to if the respective memory channel 210, 212, 214, 216, 218, 220, 222 was to operate in the second low-power state. In some examples, the memory power control circuitry 202 can associate predetermined power states of the memory channels 208, 210, 212, 214, 216, 218, 220, 222 with the respective memory address hashing policies.

In the illustrated example of FIG. 2, in response to the memory power control circuitry 202 performing an initial power state determination for the memory channels 208, 210, 212, 214, 216, 218, 220, 222, the memory power control circuitry 202 continues to dynamically control the power states of the memory channels 208, 210, 212, 214, 216, 218, 220, 222. When the example memory directing circuitry 206 receives or requests data, the memory power control circuitry 202 can determine whether the memory address hashing policy will cause the memory directing circuitry 206 to utilize one of the memory channels 210, 212, 214, 216, 218, 220, 222 operating in the first or second low-power state. In response to the memory address hashing policy causing the memory directing circuitry 206 to utilize one of the memory channels 210, 212, 214, 216, 218, 220, 222 operating in the first or second low-power state, the memory power control circuitry 202 can adjust the respective memory channel 210, 212, 214, 216, 218, 220, 222 to the high-power state to enable utilization thereof.

In the illustrated example of FIG. 2, in response to a frequency of the memory channel 210, 212, 214, 216, 218, 220, 222 being adjusted from the first or second low-power state to the high-power state satisfying (e.g., being greater than or equal to) a frequency threshold, the memory power control circuitry 202 maintains the memory channel 208, 210, 212, 214, 216, 218, 220, 222 in the high-power state and determines an updated hashing policy. For example, when the second memory channel 210 is adjusted from the first or second low-power state to the high-power state more than a threshold number of time (e.g., 3 times, 5 times, 10 times, etc.) within a predetermined period of time (e.g., 1 second, 1 minute, 1 hour, etc.), the memory power control circuitry 202 can cause the second memory channel 210 to remain in the high-power state. Accordingly, the updated hashing policy can regularly incorporate usage of the second memory channel 210 to take advantage of the new high-power state associated therewith.

In the illustrated example of FIG. 2, the memory power control circuitry 202 monitors the memory channel 210, 212, 214, 216, 218, 220, 222 adjusted from the first or second low-power state to the high-power state to determine when the memory channel 208, 210, 212, 214, 216, 218, 220, 222 can be returned to the first or second low-power state. For example, the memory power control circuitry 202 can measure an idle period of the adjusted memory channel 210, 212, 214, 216, 218, 220, 222. Further, in response to the idle period of the adjusted memory channel 210, 212, 214, 216, 218, 220, 222 satisfying (e.g., being greater than or equal to) an idle period threshold, the memory power control circuitry 202 adjusts the memory channel 210, 212, 214, 216, 218, 220, 222 from the high-power state to the first or second low-power state. In some examples, the memory power control circuitry 202 returns the memory channel 210, 212, 214, 216, 218, 220, 222 to the low-power state in which the memory channel 210, 212, 214, 216, 218, 220, 222 was previously operating. In some examples, the memory power control circuitry 202 determines whether a storage space associated with the adjusted memory channel 210, 212, 214, 216, 218, 220, 222 is empty in response to the idle period of the memory channel satisfying the idle period threshold. In some examples, in response to the storage space associated with the adjusted memory channel 210, 212, 214, 216, 218, 220, 222 not being empty, the memory power control circuitry 202 adjusts the memory channel 210, 212, 214, 216, 218, 220, 222 to the first low-power state to enable the memory channel 210, 212, 214, 216, 218, 220, 222 to be woken up and utilized at a faster rate when needed. In some examples, in response to the storage space associated with the adjusted memory channel 210, 212, 214, 216, 218, 220, 222 being empty, the memory power control circuitry 202 adjusts the memory channel 210, 212, 214, 216, 218, 220, 222 to the second low-power state to further reduce power consumed by the memory channel 210, 212, 214, 216, 218, 220, 222.

Figure 3:
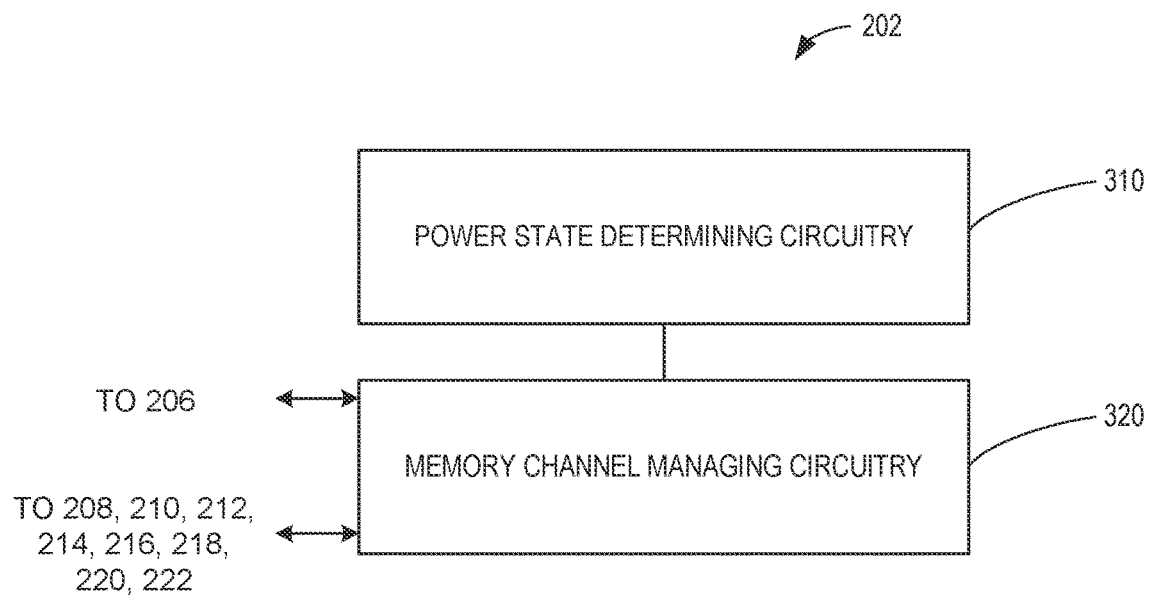
FIG. 3 is a block diagram of example memory power control circuitry of the example memory system of FIG. 2.

FIG. 3 is a block diagram of the memory power control circuitry 202 of FIG. 2. In the illustrated example of FIG. 3, the memory power control circuitry 202 includes power state determining circuitry 310 and memory channel managing circuitry 320. In FIG. 3, the memory channel managing circuitry 320 is in circuit with the memory directing circuitry 206 and the memory channels 208, 210, 212, 214, 216, 218, 220, 222 of FIG. 2.

Figure 4:
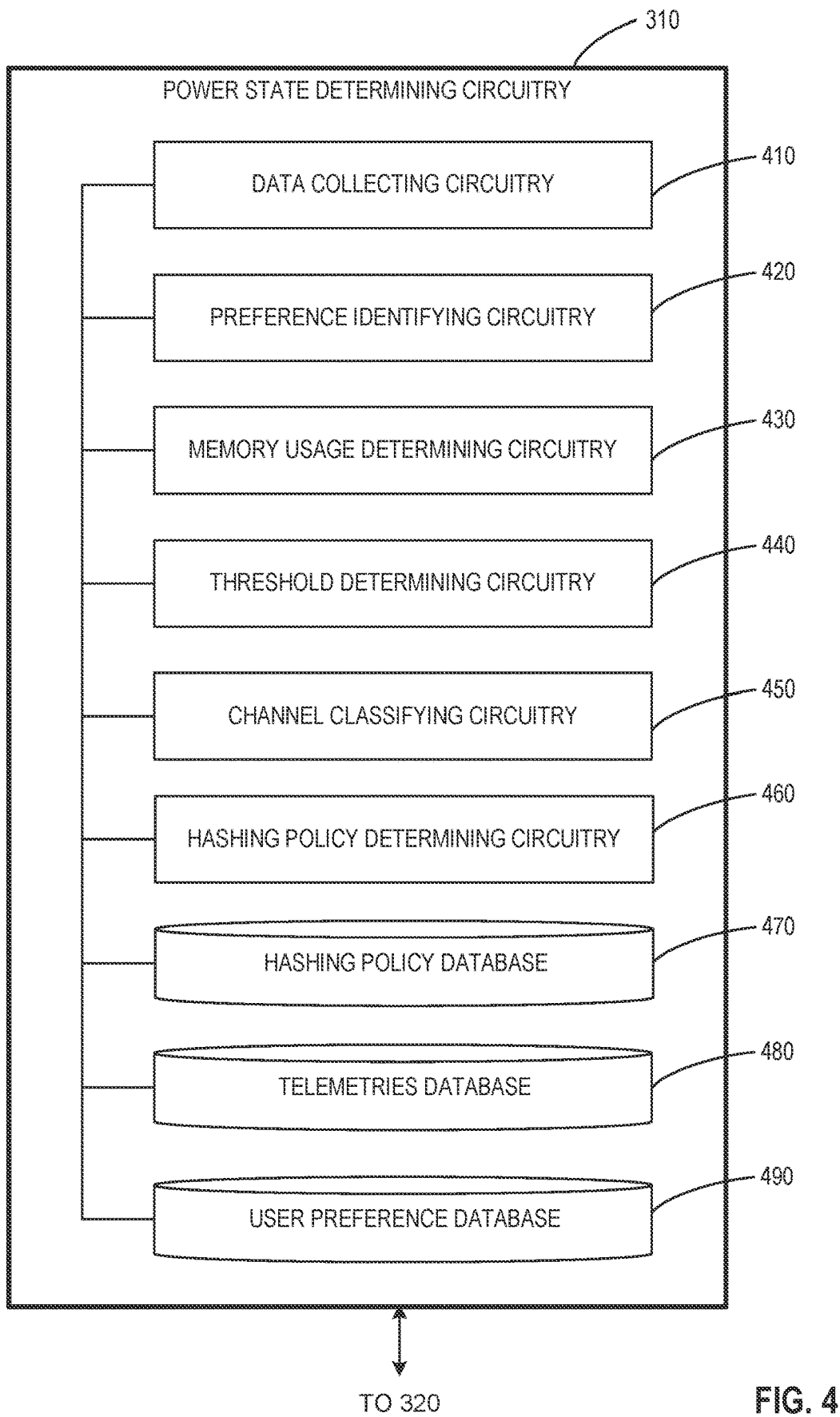
FIG. 4 is a block diagram of example power state determining circuitry of the example memory power control circuitry of FIG. 3.

Example details of the power state determining circuitry 310 are illustrated in FIG. 4. Turning to the illustrated example of FIG. 4, the power state determining circuitry 310 includes data collecting circuitry 410, preference identifying circuitry 420, memory usage determining circuitry 430, threshold determining circuitry 440, channel classifying circuitry 450, hashing policy determining circuitry 460, a hashing policy database 470, a telemetries database 480, and a user preference database 490.

In the illustrated example of FIG. 4, the data collecting circuitry 410 collects data associated with the memory system 200 (FIG. 2). For example, the data collecting circuitry 410 can determine a memory topology, application usage, and memory consumption statistics, such as a memory bandwidth consumption distribution, memory capacity statistics, memory latency sensitivity statistics, etc. The example data collecting circuitry 410 can store the data associated with the memory system 200 in the telemetries database 480. Accordingly, the example data collecting circuitry 410 can determine or generate a first portion of a user profile including data corresponding to the memory topology, the application usage, and the memory consumption statistics.

In the illustrated example of FIG. 4, the preference identifying circuitry 420 identifies user preferences associated with a usage of the memory system 200. For example, the preference identifying circuitry 420 determines whether the user prefers that the memory system 200 operate with a maximum capable memory bandwidth or power efficiency.

In some examples, the preference identifying circuitry 420 causes the user to be prompted to select between the bandwidth or power efficiency preferences. In some examples, the preference identifying circuitry 420 causes the user to be prompted in response to the power state determining circuitry 310 determining that one or more of the memory channels 208, 210, 212, 214, 216, 218, 220, 222 could operate in a low-power state based on a memory usage of the user. In some examples, the preference identifying circuitry 420 provides a suggestion to the user that power efficiency be utilized in response to the memory capacity and/or bandwidth usage of the user satisfying (e.g., being below) a threshold. In some examples, the preference identifying circuitry 420 determines whether to suggest to the user that power efficiency be utilized based on the applications utilized by the user. Further, the example preference identifying circuitry 420 can provide power saving statistics to aid the decision of the user. The preference identifying circuitry 420 can store the power efficiency or bandwidth preference of the user in the user preference database 490. Accordingly, the example preference identifying circuitry 420 can determine or generate a second portion of the user profile including data corresponding to the power efficiency or bandwidth preference of the user.

In the illustrated example of FIG. 4, the memory usage determining circuitry 430 determines memory usage data associated with the user profile, such as a capacity and/or bandwidth that the user utilizes to store data, a latency encountered as the data is stored/accessed, and/or the applications or categories of applications utilized by the user. The example memory usage determining circuitry 430 can determine the memory usage data associated with the user profile based on the data stored in the telemetries database 480. The example memory usage determining circuitry 430 determines the memory usage data based on a maximum memory capacity and/or bandwidth utilized by the user over a predetermined period of time (e.g., 1 week, 1 month, 3 months, etc.). Further, the example memory usage determining circuitry 430 can determine the memory usage data based on a maximum latency encountered over the predetermined period of time. Additionally or alternatively, the memory usage determining circuitry 430 can determine the memory usage data based on applications utilized by the user over the predetermined period of time. In some examples, the memory usage determining circuitry 430 stores the memory usage data associated with the user in the telemetries database 480.

In some examples, the memory usage determining circuitry 430 determines whether an identified maximum memory capacity and/or bandwidth utilized by the user, an identified maximum latency encountered by the user, and/or an identified application or category of applications utilized by the user is an outlier or within a standard usage of the user based on the memory usage data. For example, the memory usage determining circuitry 430 can compare the identified maximum memory capacity and/or bandwidth utilized by the user, the identified maximum latency encountered by the user, and/or the identified applications or categories of applications utilized by the user to a duration threshold, a frequency threshold, and/or a deviation threshold. Further, in response to the identified maximum memory capacity and/or bandwidth utilized by the user, the identified maximum latency encountered by the user, and/or the identified applications or categories of applications utilized by the user satisfying the duration threshold, the frequency threshold, and/or the deviation threshold, the memory usage determining circuitry 430 can confirm the identified maximum memory capacity is to be utilized for a power state determination associated with the memory channels 208, 210, 212, 214, 216, 218, 220, 222.

In the illustrated example of FIG. 4, the threshold determining circuitry 440 determines thresholds to which the memory usage is compared based on data in the hashing policy database 470 and the data in the telemetries database 480. For example, the hashing policy database 470 can include statistics associated with different hashing policies, such as data corresponding to a memory channel usage associated with the different hashing policies, a bandwidth provided by the different hashing policies, a capacity supported the different hashing policies, a latency associated with the different hashing policies, and/or applications or categories of applications associated with the different hashing policies. Further, the threshold determining circuitry 440 can determine the thresholds based on a quantity of the memory channels 208, 210, 212, 214, 216, 218, 220, 222, the supported memory capacity and/or bandwidth of the memory channels 208, 210, 212, 214, 216, 218, 220, 222, the memory channel usage associated with the different hashing policies, the bandwidth provided by the different hashing policies, the capacity supported by the different hashing policies, the latency associated with the different hashing policies, and/or the applications or categories of applications associated with the different hashing policies.

In some examples, the example threshold determining circuitry 440 determines thresholds corresponding to a maximum capacity and/or bandwidth supported by (1) the first memory channel 208, (2) the first memory channel 208 and the second memory channel 210, (3) the first memory channel 208, the second memory channel 210, and the third memory channel 212, (4) the first memory channel 208, the second memory channel 210, the third memory channel 212, and the fourth memory channel 214, (5) the first memory channel 208, the second memory channel 210, the third memory channel 212, the fourth memory channel 214, and the fifth memory channel 216, (6) the first memory channel 208, the second memory channel 210, the third memory channel 212, the fourth memory channel 214, the fifth memory channel 216, and the sixth memory channel 218, and (7) the first memory channel 208, the second memory channel 210, the third memory channel 212, the fourth memory channel 214, the fifth memory channel 216, the sixth memory channel 218, and the seventh memory channel 220. Accordingly, the example threshold determining circuitry 440 can associate the thresholds corresponding to the maximum capacity and/or bandwidth supported by the memory channels 208, 210, 212, 214, 216, 218, 220, 222 with the different hashing policies based on a usage frequency of the memory channels 208, 210, 212, 214, 216, 218, 220, 222 in the respective hashing policies. Additionally or alternatively, the example threshold determining circuitry 440 can account for the quantity of the memory channels 208, 210, 212, 214, 216, 218, 220, 222 and the maximum capacity and/or bandwidth supported by the memory channels 208, 210, 212, 214, 216, 218, 220, 222 when determining the latency thresholds associated with the respective hashing policies and/or applications or categories of applications to be mapped to the respective hashing policies. In some examples, the example threshold determining circuitry 440 determines the latency thresholds based on a default hashing policy utilized by the memory directing circuitry 206.

In the illustrated example of FIG. 4, the hashing policy determining circuitry 460 determines an address hashing policy to be utilized by the memory directing circuitry 206 to store data. For example, the hashing policy determining circuitry 460 can identify whether the user prefers that the memory system 200 operate with a maximal memory bandwidth or power efficiency. In some examples, the hashing policy determining circuitry 460 receives the user preference via the preference identifying circuitry 420 or accesses the user preference via the user preference database 490. In response to the user preferring the maximal memory bandwidth, the example hashing policy determining circuitry 460 determines that the default hashing policy, which is configured to operate with a maximal throughput, is to be utilized.

In response to the user preferring power efficiency or indicating no preference, the example hashing policy determining circuitry 460 performs a comparison between the memory usage data associated with the user profile and the respective thresholds or sets of thresholds and/or the applications associated with the address hashing policies. In turn, the example hashing policy determining circuitry 460 can determine the address hashing policy to implement based on the comparison. For example, the hashing policy determining circuitry 460 can determine a hashing policy is to be implemented in response to the memory usage data associated with the user profile including a maximum capacity and/or bandwidth that satisfies (e.g., is less than) a capacity threshold and/or a bandwidth threshold associated with the hashing policy. Additionally or alternatively, the example hashing policy determining circuitry 460 can determine the hashing policy is to be implemented in response to the memory usage data associated with the user profile including usage of applications or categories of applications linked to the hashing policy. In some examples, the hashing policy determining circuitry 460 can determine the hashing policy is to be implemented in response to the memory usage data associated with the user profile including a maximum latency encountered that satisfies (e.g., is less than) the latency threshold associated with the hashing policy.

In some examples, the hashing policy determining circuitry 460 requires that each threshold associated with a hashing policy be satisfied for the hashing policy to be implemented. In some examples, the hashing policy determining circuitry 460 requires that at least one threshold associated with a hashing policy be satisfied for the hashing policy to be implemented. In some examples, when more than one hashing policy is associated with at least one satisfied threshold, the example hashing policy determining circuitry 460 implements a hashing policy associated with the lowest ranked power consumption of the hashing policies associated with at least one satisfied threshold. For example, the hashing policy determining circuitry 460 can implement the hashing policy associated with a smallest capacity and/or bandwidth threshold satisfied or a largest latency threshold satisfied. Additionally or alternatively, the hashing policy determining circuitry 460 can implement the hashing policy associated with applications or categories of applications to most closely matches the memory usage data associated with the user profile. The example hashing policy determining circuitry 460 can transmit the determined hashing policy to the memory channel managing circuitry 320.

In some examples, the power state determining circuitry 310 receives a signal indicative of one of the memory channels 210, 212, 214, 216, 218, 220, 222 previously operating in the first or second low-power state being adjusted to the high-power state more than a threshold number of times within a predetermined period of time (e.g., more than once in 1 second). In turn, the example hashing policy determining circuitry 460 can determine an updated hashing policy that maintains the frequently adjusted memory channel 210, 212, 214, 216, 218, 220, 222 in the high-power state. Accordingly, the example hashing policy determining circuitry 460 can transmit the updated hashing policy to the memory channel managing circuitry 320. Moreover, the example hashing policy determining circuitry 460 can redetermine the hashing policy periodically based on the memory usage associated with the user profile to ensure the implemented hashing policy accounts for changes in the memory usage associated with the user profile.

In the illustrated example of FIG. 4, the channel classifying circuitry 450 determines whether the respective memory channels 210, 212, 214, 216, 218, 220, 222 are to operate in a high-power state (e.g., a full power state), a first low-power state (e.g., a self-refresh state, a sleep state, etc.), or a second low-power state (e.g., a power-off state) based on preferences of the user and the determined hashing policy. For example, the channel classifying circuitry 450 can determine the power states of the respective memory channels 208, 210, 212, 214, 216, 218, 220, 222 based on the determined hashing policy. The example channel classifying circuitry 450 can perform a comparison between a usage frequency of the respective memory channels 210, 212, 214, 216, 218, 220, 222 given the determined hashing policy and at least one usage frequency threshold. For example, when the determined hashing policy does not frequently utilize the memory channel 210, 212, 214, 216, 218, 220, 222 (e.g., utilize the memory channel 210, 212, 214, 216, 218, 220, 222 every clock cycle), the channel classifying circuitry 450 can determine the respective memory channel 210, 212, 214, 216, 218, 220, 222 is to operate in the first or second low-power state. Further, the example channel classifying circuitry 450 can compare the usage frequency of respective memory channels 210, 212, 214, 216, 218, 220, 222 given the determined hashing policy to a first usage frequency threshold associated with the first low-power mode and/or a second usage frequency threshold (less than the first usage frequency threshold) associated with the second low-power mode. Accordingly, when the usage frequency of one or more of the respective memory channels 210, 212, 214, 216, 218, 220, 222, given the determined hashing policy, satisfies (e.g., is less than) the second usage frequency threshold, the channel classifying circuitry 450 can determine the respective memory channel(s) 210, 212, 214, 216, 218, 220, 222 is/are to operate in the second low-power state to minimize or otherwise reduce power consumed thereby. Further, when the usage frequency of one or more of the respective memory channels 210, 212, 214, 216, 218, 220, 222, given the determined hashing policy, satisfies (e.g., is less than) the first usage frequency threshold and does not satisfy (e.g., is greater than) the second usage frequency threshold, the channel classifying circuitry 450 can determine the respective memory channel(s) 210, 212, 214, 216, 218, 220, 222 is/are to operate in the first low-power state to reduce power consumed thereby while enabling the respective memory channel(s) 210, 212, 214, 216, 218, 220, 222 to be quickly converted to the high-power state for utilization when needed. As a result, the channel classifying circuitry 450 enables the respective memory channel(s) 210, 212, 214, 216, 218, 220, 222 to consume less power while still waking up quickly to transport data when needed. The example channel classifying circuitry 450 can transmit the determined power state for the respective memory channels 208, 210, 212, 214, 216, 218, 220, 222 to the memory channel managing circuitry 320.

In the illustrated example of FIG. 4, in response to the memory directing circuitry 206 causing one of the memory channels 210, 212, 214, 216, 218, 220, 222 in the first or second low-power state to encounter traffic (e.g., retrieve or store data), the channel classifying circuitry 450 can determine the memory channel 210, 212, 214, 216, 218, 220, 222 is to be adjusted from the first or second low-power state to the high-power state. The example memory channel managing circuitry 320 can transmit a signal indicative of the respective memory channel 210, 212, 214, 216, 218, 220, 222 encountering the traffic to the power state determining circuitry 310, as discussed in further detail below. In turn, the example channel classifying circuitry 450 can determine the memory channel 210, 212, 214, 216, 218, 220, 222 to adjust to the high-power state. The example channel classifying circuitry 450 can transmit a signal indicative of the power state adjustment of the respective one of the memory channels 210, 212, 214, 216, 218, 220, 222 to the memory channel managing circuitry 320.

In the illustrated example of FIG. 4, the channel classifying circuitry 450 receives a signal indicative of the adjusted memory channel 210, 212, 214, 216, 218, 220, 222 being unutilized for at least a threshold period of time and, in turn, determines the memory channel 210, 212, 214, 216, 218, 220, 222 is to return to the first or second low-power state. The example channel classifying circuitry 450 can determine whether the memory channel 210, 212, 214, 216, 218, 220, 222 is to be adjusted to the first or second low-power state based on the low-power state in which the memory channel 210, 212, 214, 216, 218, 220, 222 previously operated. When the example channel classifying circuitry 450 identifies that the memory channel 210, 212, 214, 216, 218, 220, 222 was previously in the second low-power state, the channel classifying circuitry 450 can determine whether a storage space associated with the memory channel 210, 212, 214, 216, 218, 220, 222 is empty. In response to the storage space associated with the memory channel 210, 212, 214, 216, 218, 220, 222 being empty, the example channel classifying circuitry 450 determines the memory channel 210, 212, 214, 216, 218, 220, 222 is to be adjusted back to the second low-power state. In response to the storage space associated with the memory channel 210, 212, 214, 216, 218, 220, 222 not being empty, the example channel classifying circuitry 450 determines the memory channel 210, 212, 214, 216, 218, 220, 222 is to be adjusted to the first low-power state to enable the data in storage space associated with the memory channel 210, 212, 214, 216, 218, 220, 222 to be accessed at a faster rate as a wakeup time from the first low-power state is shorter than a wakeup time from the second low-power state. Accordingly, the example power state determining circuitry 310 can transmit a signal indicative of the determined power state of the memory channel 210, 212, 214, 216, 218, 220, 222 to the memory channel managing circuitry 320, which can adjust the power state of the memory channel 210, 212, 214, 216, 218, 220, 222, as discussed in further detail below.

In the illustrated example of FIG. 4, the hashing policy database 470 includes predetermined hashing policies and information associated therewith. For example, the example hashing policy database 470 can include applications or categories of applications linked to the predetermined hashing policies, a quantity of memory channels that the predetermined hashing policies utilize, a usage frequency of the memory channels 208, 210, 212, 214, 216, 218, 220, 222 associated with the predetermined hashing policies, estimated bandwidths or latencies provided by the predetermined hashing policies, storage capacities for which the predetermined hashing policies are to be utilized, etc. The example hashing policy database 470 can include respective power state configurations of the memory channels 208, 210, 212, 214, 216, 218, 220, 222 for the respective predetermined hashing policies. Accordingly, the example channel classifying circuitry 450 can perform a lookup in the hashing policy database 470 to identify the power states of the memory channels 208, 210, 212, 214, 216, 218, 220, 222 corresponding to the determined hashing policy to be implemented. Further, the example hashing policy database 470 can sort or rank the predetermined hashing policies based on the power savings provided thereby.

In the illustrated example of FIG. 4, the telemetries database 480 (FIG. 4) includes data corresponding to the topology of the memory system 200, the memory consumption statistics, the memory bandwidth consumption distribution, the memory capacity statistics, a memory latency sensitivity, a usage of the memory channels 208, 210, 212, 214, 216, 218, 220, 222, and/or the overall memory capacity usage associated with the user. Accordingly, a first portion of the user profile can be stored in the example telemetries database 480.

In the illustrated example of FIG. 4, the user preference database 490 (FIG. 4) includes data indicative of whether the user prefers to operate with a maximal memory bandwidth or power efficiency. In some examples, the user preference database 490 includes a memory bandwidth requirement specified by the user. Accordingly, a second portion of the user profile can be stored in the example user preference database 490.

FIG. 5 illustrates example pseudocode 500 that the power state determining circuitry 310 (FIGS. 3 and 4) can execute to determine a hashing policy to utilize and power states of the respective memory channels 208, 210, 212, 214, 216, 218, 220, 222 (FIG. 2) based on user preferences and memory usage data associated with the user profile. However, it should be understood that the example pseudocode 500 is only representative of one possible method of determining the hashing policy and power states of the memory channels 208, 210, 212, 214, 216, 218, 220, 222 and that various other methods can be utilized in accordance with teachings disclosed herein. In FIG. 5, the example channel classifying circuitry 450 (FIG. 4) executes a first portion 502 of the pseudocode 500 in response to identifying the user prefers power efficient operations or has no preference to operate with a maximal memory bandwidth.

In the first portion 502 of the pseudocode, the example channel classifying circuitry 450 executes a first operation 504 to determine a quantity of the memory channels 208, 210, 212, 214, 216, 218, 220, 222 required by the memory capacity usage data associated with the user. The example hashing policy determining circuitry 460 (FIG. 4) can execute a second operation 506 (e.g., a hashing policy determining function) to determine an eligible hashing polic(ies) based on the quantity of the memory channels 208, 210, 212, 214, 216, 218, 220, 222 required given the memory capacity usage and an address range of the memory channels 208, 210, 212, 214, 216, 218, 220, 222 to be utilized. Further, the example hashing policy determining circuitry 460 can execute a third operation 508 to compare a bandwidth provided by the identified hashing polic(ies) to an identified bandwidth requirement. For example, the identified bandwidth requirement can be based on the memory usage associated with the user (e.g., a maximum memory bandwidth utilized over 1 month) and/or a bandwidth specified by the user. In some examples, the example hashing policy determining circuitry 460 begins the third operation 508 with the eligible hashing policies that provide a reduced bandwidth and switches to the eligible hashing policies that provide an increased bandwidth in response to the reduced bandwidth being less than the identified bandwidth requirement. Accordingly, the example hashing policy determining circuitry 460 can determine the hashing policy is to be implemented in response to the bandwidth provided by the determined hashing policy being greater than or equal to the identified bandwidth requirement. In turn, the example channel classifying circuitry 450 (FIG. 4) can execute a fourth example operation 510 to configure the respective memory channels 210, 212, 214, 216, 218, 220, 222 outside the target address range of the determined hashing policy as cold channels (e.g., first or second low-power state channels).

In the illustrated example of FIG. 5, the channel classifying circuitry 450 executes a second portion 512 of the pseudocode 500 in response to identifying the user prefers to operate with the maximal memory bandwidth. In the second portion 512 of the pseudocode 500, the example hashing policy determining circuitry 460 executes a fifth example operation 514 to determine a default hashing policy is to be utilized, which can employ all of the memory channels 208, 210, 212, 214, 216, 218, 220, 222. In turn, the example channel classifying circuitry 450 can execute a sixth example operation 516 to set all of the memory channels 208, 210, 212, 214, 216, 218, 220, 222 to the high-power state.

Figure 6:
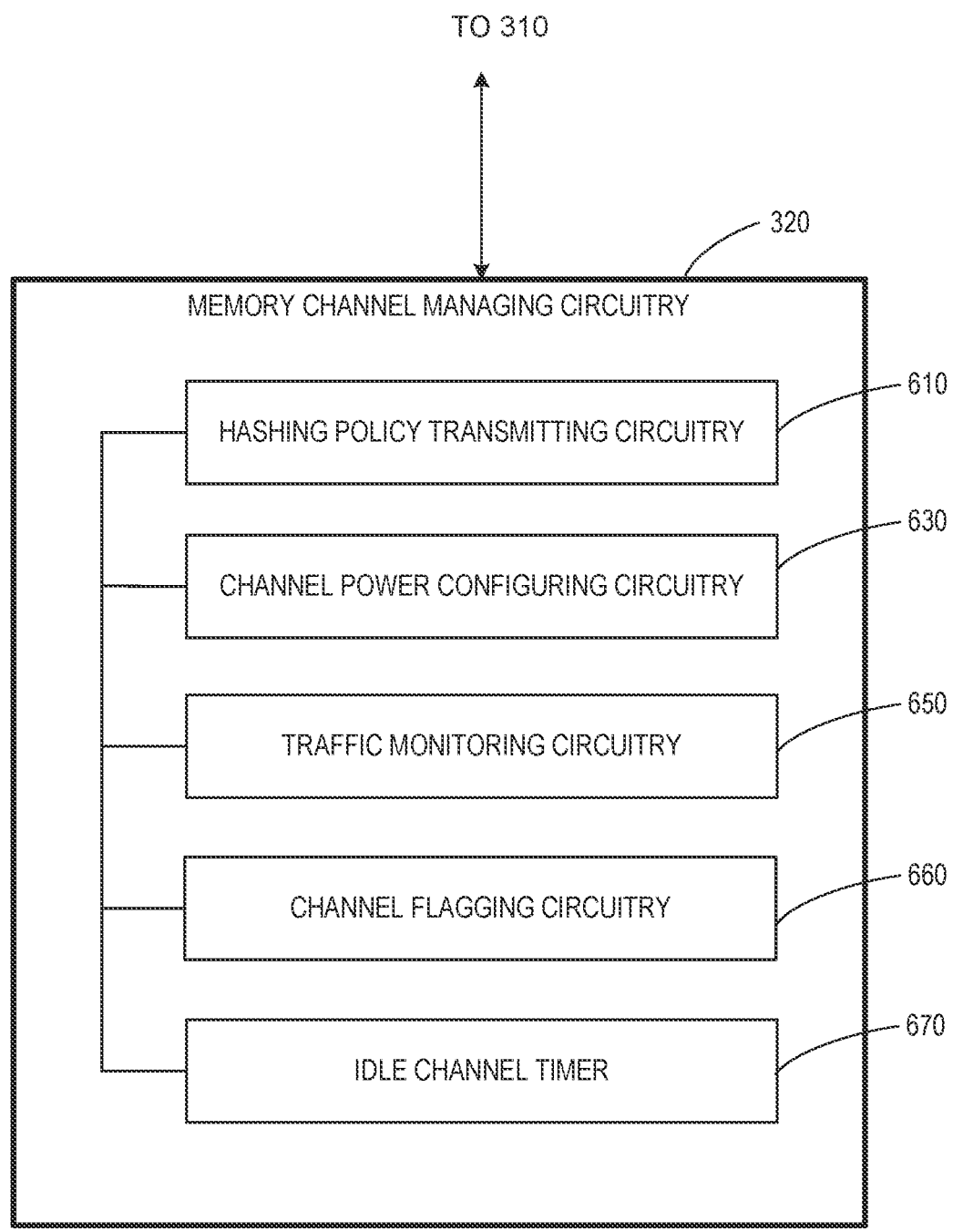
FIG. 6 is a block diagram of example memory channel managing circuitry of the example memory power control circuitry of FIG. 3.

The example memory channel managing circuitry 320 is illustrated in FIG. 6. In the illustrated example of FIG. 6, the memory channel managing circuitry 320 includes hashing policy transmitting circuitry 610, channel power configuring circuitry 630, traffic monitoring circuitry 650, and an idle channel timer 560.

In the illustrated example of FIG. 6, the hashing policy transmitting circuitry 610 transmits the hashing policy to the memory directing circuitry 206 (FIG. 2) for implementation. For example, in response to the memory channel managing circuitry 320 receiving the hashing policy via the power state determining circuitry 310 (FIG. 3), the hashing policy transmitting circuitry 610 can relay a signal indicative of the hashing policy to the memory directing circuitry 206. In some examples, the hashing policy transmitting circuitry 610 receives an updated hashing policy to be implemented and, in turn, transmits a signal indicative of the updated hashing policy to the memory directing circuitry 206.

In the illustrated example of FIG. 6, the example channel power configuring circuitry 630 causes the respective memory channels 208, 210, 212, 214, 216, 218, 220, 222 to operate in the first low-power state, the second low-power state, or the high-power state based on the determined power states for the memory channels 208, 210, 212, 214, 216, 218, 220, 222 received via the power state determining circuitry 310. In some examples, the channel power configuring circuitry 630 deactivates or shuts off power to the respective memory channels 210, 212, 214, 216, 218, 220, 222 that are to operate in the second low-power state. For example, the channel power configuring circuitry 630 can operate a switch or logic gate to cut-off power to the respective memory channels 210, 212, 214, 216, 218, 220, 222 that are to operate in the second low-power state. In some examples, when one or more of the memory channels 210, 212, 214, 216, 218, 220, 222 are to operate in the first low-power state, the channel power configuring circuitry 630 causes the respective memory channels 210, 212, 214, 216, 218, 220, 222 to receive a reduced amount of power. For example, the channel power configuring circuitry 630 can enable the first low-power state memory channels 210, 212, 214, 216, 218, 220, 222 to receive a minimal baseline power instead of shutting down the low-power state memory channels 210, 212, 214, 216, 218, 220, 222 to enable the low-power state memory channels 210, 212, 214, 216, 218, 220, 222 to be reactivated at a faster rate and with a reduced power consumption. Additionally or alternatively, the example channel power configuring circuitry 630 can transmit a signal to a power controller associated with the memory system 200 to cause the power controller to stop providing power to the respective memory channels 210, 212, 214, 216, 218, 220, 222 that are to operate in the second low-power state or to provide the reduced amount of power to the respective memory channels 210, 212, 214, 216, 218, 220, 222 that are to operate in the first low-power state. In some examples, the example channel power configuring circuitry 630 can update the power state of the memory channels 210, 212, 214, 216, 218, 220, 222 while the memory system 200 is running. In some examples, the channel power configuring circuitry 630 updates the power state of the memory channels 210, 212, 214, 216, 218, 220, 222 during a reboot of the memory system 200.

In the illustrated example of FIG. 6, the channel power configuring circuitry 630 can adjust a first or second low-power state memory channel 210, 212, 214, 216, 218, 220, 222 to the high-power state. For example, when the implemented hashing policy causes the first or second low-power state memory channel 210, 212, 214, 216, 218, 220, 222 to encounter traffic, the channel power configuring circuitry 630 can adjust the respective memory channel 210, 212, 214, 216, 218, 220, 222 from the first or second low-power state to the high-power state. Further, the example channel power configuring circuitry 630 can transmit a signal indicative of the power state adjustment to the power state determining circuitry 310. In some examples, in response to the first or second low-power state memory channel 210, 212, 214, 216, 218, 220, 222 being adjusted more than a threshold number of times, the example hashing policy determining circuitry 460 (FIG. 4) can determine an updated hashing policy, which the hashing policy transmitting circuitry 610 receives and transmits to the memory directing circuitry 206 (FIG. 2).

In the illustrated example of FIG. 6, the traffic monitoring circuitry 650 monitors traffic to be directed to the memory channels 208, 210, 212, 214, 216, 218, 220, 222. For example, the traffic monitoring circuitry 650 can determine which of the memory channels is to be utilized to store the traffic based on the implemented hashing policy. In some examples, in response to determining the hashing policy is causing traffic to be directed to one of the memory channels 208, 210, 212, 214, 216, 218, 220, 222 operating in the first or second low-power state, the traffic monitoring circuitry 650 transmits a signal to the channel power configuring circuitry 630 to cause the respective memory channel 210, 212, 214, 216, 218, 220, 222 to be adjusted to the high-power state.

In the illustrated example of FIG. 6, the channel flagging circuitry 660 flags (e.g., assigns an identifier to, makes note of, etc.) the memory channels 210, 212, 214, 216, 218, 220, 222 adjusted from the low-power state to the high-power state. Specifically, the example channel flagging circuitry 660 flags the memory channels 210, 212, 214, 216, 218, 220, 222 to indicate that the memory channels 210, 212, 214, 216, 218, 220, 222 can be returned to the first or second low-power state when certain conditions are met. For example, the channel flagging circuitry 660 can determine the flagged memory channel 210, 212, 214, 216, 218, 220, 222 can be returned to the first or second low-power state when the flagged memory channel 210, 212, 214, 216, 218, 220, 222 is idle (e.g., unutilized) for a threshold period of time (e.g., 6 hours, 12 hours, 1 day, etc.).

In the illustrated example of FIG. 6, the channel flagging circuitry 660 initiates or starts the idle channel timer 670 in response to the flagged memory channel 210, 212, 214, 216, 218, 220, 222 not being utilized. The example idle channel timer 670 can count upwards toward the threshold period of time or down from the threshold period of time. However, the example idle channel timer 670 stops and resets in response to the flagged memory channel 210, 212, 214, 216, 218, 220, 222 receiving data. Accordingly, the example idle channel timer 670 restarts again when the flagged memory channel 210, 212, 214, 216, 218, 220, 222 is no longer being utilized. When the idle channel timer 670 expires or reaches the threshold period of time, the example channel flagging circuitry 660 determines the flagged memory channel 210, 212, 214, 216, 218, 220, 222 can be returned to the first or second low-power state. In turn, the example channel flagging circuitry 660 sends a signal to the power state determining circuitry 310 to enable the channel classifying circuitry 450 (FIG. 4) to determine whether the memory channel 210, 212, 214, 216, 218, 220, 222 is to operate in the first or second low-power state. Accordingly, the channel power configuring circuitry 630 can cause the flagged memory channel 210, 212, 214, 216, 218, 220, 222 to be adjusted from the high-power state to the first or second low-power state based on the determination by the channel classifying circuitry 450.

In the illustrated example of FIG. 6, the channel flagging circuitry 660 only flags the memory channels 210, 212, 214, 216, 218, 220, 222 a threshold number of times (e.g., 3 times, 5 times, 10 times, etc.) over a predetermined period of time (e.g., 1 second, 1 minute, 1 hour, etc.). As such, when one of the memory channels 210, 212, 214, 216, 218, 220, 222 is adjusted from the first or second low-power state to the high-power state more than the threshold number of times over the predetermined period of time, the example memory channel managing circuitry 320 no longer monitors for when the respective memory channel 210, 212, 214, 216, 218, 220, 222 can be switched back to the low-power state. In turn, the example memory channel managing circuitry 320 sends a signal indicative of the high power-state of the respective memory channel 210, 212, 214, 216, 218, 220, 222 being maintained to the power state determining circuitry 310 to trigger the hashing policy determining circuitry 460 to determine an updated hashing policy.

FIG. 7 illustrates a block diagram of the example memory directing circuitry 206 of FIG. 2. In the illustrated example of FIG. 7, the memory directing circuitry 206 includes hashing policy setting circuitry 710, data storing circuitry 720, data sorting circuitry 730, and data accessing circuitry 740.

In the illustrated example of FIG. 7, the hashing policy setting circuitry 710 configures an address hashing policy to be utilized to store data. For example, the hashing policy setting circuitry 710 can configure the hashing policy based on a signal indicative of the hashing policy received via the memory power control circuitry 202. In some examples, the hashing policy setting circuitry 710 utilizes a default hashing policy initially (e.g., in advance of receiving the signal indicative of the hashing policy to utilize). For example, during an initial time period wherein the memory power control circuitry 202 is still determining the memory usage associated with the user profile, the hashing policy setting circuitry 710 can determine a maximal bandwidth hashing policy is to be utilized.

In the illustrated example of FIG. 7, the data storing circuitry 720 stores data in one or more of the memory channels 208, 210, 212, 214, 216, 218, 220, 222. For example, the data storing circuitry 720 can store data received via the data processing circuitry 204. Specifically, the example data storing circuitry 720 stores the data in one or more of the memory channels 208, 210, 212, 214, 216, 218, 220, 222 based on the address hashing policy configured by the hashing policy setting circuitry 710.

In the illustrated example of FIG. 7, the data sorting circuitry 730 sorts or moves data between the memory channels 208, 210, 212, 214, 216, 218, 220, 222. For example, the data sorting circuitry 730 can move data from one or more of the memory channels 210, 212, 214, 216, 218, 220, 222 in response to the hashing policy setting circuitry 710 receiving a hashing policy wherein the respective memory channels 210, 212, 214, 216, 218, 220, 222 are not to be utilized.

In the illustrated example of FIG. 7, the data accessing circuitry 740 accesses or extracts data from the memory channels 208, 210, 212, 214, 216, 218, 220, 222. For example, the data accessing circuitry 740 can extract data from one of the memory channels 208, 210, 212, 214, 216, 218, 220, 222 in response to receiving a request for the data via the data processing circuitry 204.

In some examples, the apparatus includes means for determining memory usage data corresponding to a user profile. For example, the means for determining the memory usage data may be implemented by the memory usage determining circuitry 430. In some examples, the memory usage determining circuitry 430 may be instantiated by processor circuitry such as the example processor circuitry 1412 of FIG. 14. For instance, the memory usage determining circuitry 430 may be instantiated by the example general purpose processor circuitry 1500 of FIG. 15 executing machine executable instructions such as that implemented by at least blocks 802, 804, 806, 1102 of FIGS. 8 and/or 11. In some examples, the memory usage determining circuitry 430 may be instantiated by hardware logic circuitry, which may be implemented by an ASIC or the FPGA circuitry 1600 of FIG. 16 structured to perform operations corresponding to the machine readable instructions. Additionally or alternatively, the memory usage determining circuitry 430 may be instantiated by any other combination of hardware, software, and/or firmware. For example, the memory usage determining circuitry 430 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining power states for memory channels. For example, the means for determining the power states may be implemented by the channel classifying circuitry 450. In some examples, the channel classifying circuitry 450 may be instantiated by processor circuitry such as the example processor circuitry 1412 of FIG. 14. For instance, the channel classifying circuitry 450 may be instantiated by the example general purpose processor circuitry 1500 of FIG. 15 executing machine executable instructions such as that implemented by at least blocks 816, 1002, 1004, 1106 of FIGS. 8, 10, and/or 11. In some examples, the channel classifying circuitry 450 may be instantiated by hardware logic circuitry, which may be implemented by an ASIC or the FPGA circuitry 1600 of FIG. 16 structured to perform operations corresponding to the machine readable instructions. Additionally or alternatively, the channel classifying circuitry 450 may be instantiated by any other combination of hardware, software, and/or firmware. For example, the channel classifying circuitry 450 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining a hashing policy. For example, the means for determining the hashing policy may be implemented by the hashing policy determining circuitry 460. In some examples, the hashing policy determining circuitry 460 may be instantiated by processor circuitry such as the example processor circuitry 1412 of FIG. 14. For instance, the hashing policy determining circuitry 460 may be instantiated by the example general purpose processor circuitry 1500 of FIG. 15 executing machine executable instructions such as that implemented by at least blocks 810, 902, 904, 906, 1008, 1104 of FIGS. 8, 9, 10, and/or 11. In some examples, the hashing policy determining circuitry 460 may be instantiated by hardware logic circuitry, which may be implemented by an ASIC or the FPGA circuitry 1600 of FIG. 16 structured to perform operations corresponding to the machine readable instructions. Additionally or alternatively, the hashing policy determining circuitry 460 may be instantiated by any other combination of hardware, software, and/or firmware. For example, the hashing policy determining circuitry 460 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for adjusting the power states of the memory channels. For example, the means for adjusting may be implemented by the channel power configuring circuitry 630. In some examples, the channel power configuring circuitry 630 may be instantiated by processor circuitry such as the example processor circuitry 1412 of FIG. 14. For instance, the channel power configuring circuitry 630 may be instantiated by the example general purpose processor circuitry 1500 of FIG. 15 executing machine executable instructions such as that implemented by at least blocks 818, 820, 1004, 1014 of FIGS. 8 and/or 10. In some examples, the channel power configuring circuitry 630 may be instantiated by hardware logic circuitry, which may be implemented by an ASIC or the FPGA circuitry 1600 of FIG. 16 structured to perform operations corresponding to the machine readable instructions. Additionally or alternatively, the channel power configuring circuitry 630 may be instantiated by any other combination of hardware, software, and/or firmware. For example, the channel power configuring circuitry 630 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for monitoring traffic to the memory channels. For example, the means for monitoring may be implemented by the traffic monitoring circuitry 650. In some examples, the traffic monitoring circuitry 650 may be instantiated by processor circuitry such as the example processor circuitry 1412 of FIG. 14. For instance, the traffic monitoring circuitry 650 may be instantiated by the example general purpose processor circuitry 1500 of FIG. 15 executing machine executable instructions such as that implemented by at least block 1002 of FIG. 10. In some examples, the traffic monitoring circuitry 650 may be instantiated by hardware logic circuitry, which may be implemented by an ASIC or the FPGA circuitry 1600 of FIG. 16 structured to perform operations corresponding to the machine readable instructions. Additionally or alternatively, the traffic monitoring circuitry 650 may be instantiated by any other combination of hardware, software, and/or firmware. For example, the traffic monitoring circuitry 650 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for measuring an idle period of the memory channels. For example, the means for measuring may be implemented by the idle channel timer 670. In some examples, the idle channel timer 670 may be instantiated by processor circuitry such as the example processor circuitry 1412 of FIG. 14. For instance, the idle channel timer 670 may be instantiated by the example general purpose processor circuitry 1500 of FIG. 15 executing machine executable instructions such as that implemented by at least block 1010 of FIG. 10. In some examples, the idle channel timer 670 may be instantiated by hardware logic circuitry, which may be implemented by an ASIC or the FPGA circuitry 1600 of FIG. 16 structured to perform operations corresponding to the machine readable instructions. Additionally or alternatively, the idle channel timer 670 may be instantiated by any other combination of hardware, software, and/or firmware. For example, the idle channel timer 670 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for comparing the idle period of the memory channels to an idle period threshold. For example, the means for comparing may be implemented by the channel flagging circuitry 660. In some examples, the channel flagging circuitry 660 may be instantiated by processor circuitry such as the example processor circuitry 1412 of FIG. 14. For instance, the channel flagging circuitry 660 may be instantiated by the example general purpose processor circuitry 1500 of FIG. 15 executing machine executable instructions such as that implemented by at least blocks 1004, 1006, 1012 of FIG. 10. In some examples, the channel flagging circuitry 660 may be instantiated by hardware logic circuitry, which may be implemented by an ASIC or the FPGA circuitry 1600 of FIG. 16 structured to perform operations corresponding to the machine readable instructions. Additionally or alternatively, the channel flagging circuitry 660 may be instantiated by any other combination of hardware, software, and/or firmware. For example, the channel flagging circuitry 660 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the memory power control circuitry 202 of FIG. 2 is illustrated in FIGS. 3, 4, and 6, one or more of the elements, processes, and/or devices illustrated in FIGS. 3, 4, and 6 may be combined, divided, re-arranged, omitted, eliminated, and/or implemented in any other way. Further, the example power state determining circuitry 310, the example memory channel managing circuitry 320, the example data collecting circuitry 410, the example preference identifying circuitry 420, the example memory usage determining circuitry 430, the example threshold determining circuitry 440, the example channel classifying circuitry 450, the example hashing policy determining circuitry 460, the example hashing policy database 470, the example telemetries database 480, the example user preference database 490, the example hashing policy transmitting circuitry 610, the example channel power configuring circuitry 630, the example traffic monitoring circuitry 650, the example channel flagging circuitry 660, the example idle channel timer 670, and/or, more generally, the example memory power control circuitry 202 of FIG. 2, may be implemented by hardware alone or by hardware in combination with software and/or firmware. Thus, for example, any of the example power state determining circuitry 310, the example memory channel managing circuitry 320, the example data collecting circuitry 410, the example preference identifying circuitry 420, the example memory usage determining circuitry 430, the example threshold determining circuitry 440, the example channel classifying circuitry 450, the example hashing policy determining circuitry 460, the example hashing policy database 470, the example telemetries database 480, the example user preference database 490, the example hashing policy transmitting circuitry 610, the example channel power configuring circuitry 630, the example traffic monitoring circuitry 650, the example channel flagging circuitry 660, the example idle channel timer 670, and/or, more generally, the example memory power control circuitry 202, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example memory power control circuitry 202 of FIG. 2 may include one or more elements, processes, and/or devices in addition to, or instead of, those illustrated in FIGS. 3, 4, and 6, and/or may include more than one of any or all of the illustrated elements, processes and devices.

While an example manner of implementing the memory directing circuitry 206 of FIG. 2 is illustrated in FIG. 7, one or more of the elements, processes, and/or devices illustrated in FIG. 7 may be combined, divided, re-arranged, omitted, eliminated, and/or implemented in any other way. Further, the example hashing policy setting circuitry 710, the example data storing circuitry 720, the example data sorting circuitry 730, the example data accessing circuitry 740, and/or, more generally, the example memory directing circuitry 206 of FIG. 2, may be implemented by hardware alone or by hardware in combination with software and/or firmware. Thus, for example, any of the example hashing policy setting circuitry 710, the example data storing circuitry 720, the example data sorting circuitry 730, the example data accessing circuitry 740, and/or, more generally, the example memory directing circuitry 206, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example memory directing circuitry 206 of FIG. 2 may include one or more elements, processes, and/or devices in addition to, or instead of, those illustrated in FIG. 7, and/or may include more than one of any or all of the illustrated elements, processes and devices.

Flowcharts representative of example hardware logic circuitry, machine readable instructions, hardware implemented state machines, and/or any combination thereof for implementing the memory power control circuitry 202 of FIG. 2 are shown in FIGS. 8, 9, 10, and 11. A flowchart representative of example hardware logic circuitry, machine readable instructions, hardware implemented state machines, and/or any combination thereof for implementing the memory directing circuitry 206 of FIG. 2 is shown in FIG. 12. The machine readable instructions of FIGS. 8, 9, 10, and 11 may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 15 and/or 16. The machine readable instructions of FIG. 12 may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 8, 9, 10, 11, and 12, many other methods of implementing the example memory power control circuitry 202 and/or the example memory directing circuitry 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8, 9, 10, 11, and 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
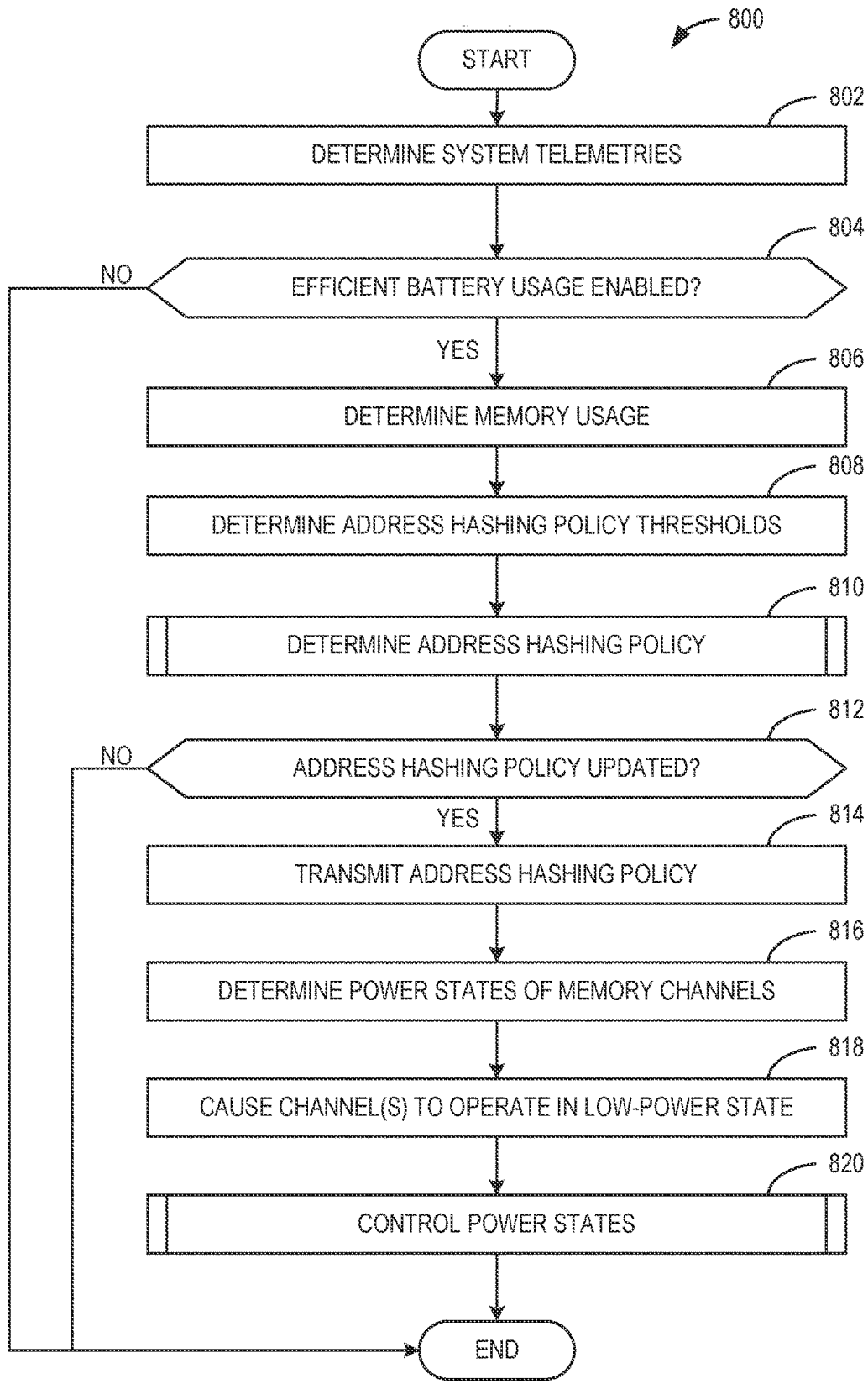
FIG. 8 is a first flowchart representative of example machine readable instructions and/or example operations that may be executed by example processor circuitry to implement the example memory power control circuitry of FIGS. 2 and 3.

FIG. 8 is a first flowchart representative of example machine readable instructions and/or example operations 800 that may be executed and/or instantiated by processor circuitry to implement the memory power control circuitry 202 (FIGS. 2, 3, 4, and 6) to control power states of the memory channels 208, 210, 212, 214, 216, 218, 220, 222 of FIG. 2 and, in turn, enable the memory system 200 of FIG. 2 to operate with reduced power consumption and increased power efficiency. The machine readable instructions and/or the operations 800 of FIG. 8 begin at block 802, at which the example memory power control circuitry 202 determines telemetries associated with the memory system 200 (FIG. 2). For example, the power state determining circuitry 310 (FIGS. 3 and 4) can determine memory consumption statistics, a memory bandwidth consumption distribution, memory capacity statistics, application usage, a memory latency sensitivity, a memory topology, and/or a usage of the memory channels 208, 210, 212, 214, 216, 218, 220, 222. In some examples, the data collecting circuitry 410 (FIG. 4) collects the telemetries associated with the memory system 200. In some examples, the data collecting circuitry 410 stores the memory consumption statistics, the memory bandwidth consumption distribution, the memory capacity statistics, the application usage, the memory latency sensitivity, the memory topology, and/or the usage of the memory channels 208, 210, 212, 214, 216, 218, 220, 222 (e.g., data associated with the user profile) in the telemetries database 480. Accordingly, the example data collecting circuitry 410 can generate a user profile including data corresponding to the telemetries.

At block 804, the example memory power control circuitry 202 determines whether efficient battery usage is enabled. For example, the power state determining circuitry 310 can identify whether the efficient battery usage is enabled. In some examples, the preference identifying circuitry 420 (FIG. 4) can determine the efficient battery usage is enabled in response to the user indicating a preference for efficient battery power usage over operating with a maximal memory bandwidth. In some examples, the preference identifying circuitry 420 determines the efficient battery usage is enabled in response to the user indicating no preference, and control advances to block 806. When efficient battery usage is not enabled, the operations 800 terminate. In some examples, the preference identifying circuitry 420 stores the user preference (e.g., data associated with the user profile) in the user preference database 490. Accordingly, the example preference identifying circuitry 420 updates the user profile to include the preference of the user associated with the memory system 200.

At block 806, the example memory power control circuitry 202 determines a memory usage associated with the user of the memory system 200. For example, the power state determining circuitry 310 can identify data corresponding to the memory usage of the user profile over a predetermined period of time via the telemetries database 480. In some examples, the memory usage determining circuitry 430 (FIG. 4) determines the memory usage corresponding to the user profile based on a maximum memory capacity and/or bandwidth utilized, a maximum latency encountered, and/or applications utilized by the user over an initial month of operations of the memory system 200.

At block 808, the example memory power control circuitry 202 determines address hashing policy thresholds. For example, the power state determining circuitry 310 can determine the address hashing policy thresholds based on a quantity of the memory channels 208, 210, 212, 214, 216, 218, 220, 222, a supported capacity of the memory channels 208, 210, 212, 214, 216, 218, 220, 222, a supported bandwidth of the memory channels 208, 210, 212, 214, 216, 218, 220, 222, a memory latency of different applications or categories of applications, predetermined memory latencies encountered using the default hashing policy, and/or any other memory consumption statistics. In some examples, the threshold determining circuitry 440 (FIG. 4) determines the address hashing policy thresholds to be associated with different address hashing policies.

At block 810, the example memory power control circuitry 202 determines the address hashing policy to be utilized. For example, the power state determining circuitry 310 can determine the address hashing policy to be utilized based on the memory usage associated with the user profile and the address hashing policy thresholds. In some examples, the hashing policy determining circuitry 460 (FIG. 4) performs a comparison between the memory usage associated with the user profile and the address hashing policy thresholds associated with different hashing policies to determine the address hashing policy to be utilized, as discussed in further detail below. Example instructions that may be used to implement block 810 are described below in connection with FIG. 9.

At block 812, the example memory power control circuitry 202 determines whether the address hashing policy has been updated. For example, the power state determining circuitry 310 can determine whether the address hashing policy to be utilized is different from the default address hashing policy. In some examples, the hashing policy determining circuitry 460 determines whether the address hashing policy has been updated in response to determining the address hashing policy. In some examples, the channel classifying circuitry 450 determines whether any of the respective memory channels 208, 210, 212, 214, 216, 218, 220, 222 are to operate in the low-power state based on the comparison between the memory capacity usage and the power state thresholds. When the address hashing policy is not updated, the operations 800 terminate.

When the memory power control circuitry 202 determines, at block 812, that the address hashing policy is updated, control advances to block 814, at which the example memory power control circuitry 202 transmits the address hashing policy to be utilized to the memory directing circuitry 206 (FIG. 2). For example, the power state determining circuitry 310 can indicate the updated address hashing policy to the memory channel managing circuitry 320 (FIGS. 3 and 6). Further, the memory channel managing circuitry 320 can transmit a signal indicative of the updated address hashing policy to the memory directing circuitry 206. In some examples, the hashing policy transmitting circuitry 610 (FIG. 6) transmits the selected address hashing policy to the memory directing circuitry 206.

At block 816, the example memory power control circuitry 202 determines power states of the memory channels 208, 210, 212, 214, 216, 218, 220, 222. For example, the power state determining circuitry 310 can determine the power states of the memory channels 208, 210, 212, 214, 216, 218, 220, 222 based on the updated address hashing policy. In some examples, the hashing policy database 470 includes predetermined power states for the memory channels associated with different address hashing policies. In turn, the example channel classifying circuitry 450 can perform a look-up in the hashing policy database 470 to determine the power states of the memory channels 208, 210, 212, 214, 216, 218, 220, 222 that correspond with the updated hashing policy.

At block 818, the example memory power control circuitry 202 causes one or more of the memory channels 210, 212, 214, 216, 218, 220, 222 to operate in the first or second low-power state. For example, the memory channel managing circuitry 320 can prevent the respective memory channel(s) 210, 212, 214, 216, 218, 220, 222 that are to operate in the second low-power state (e.g., the power-off state) from receiving power. In some examples, the memory channel managing circuitry 320 causes the respective memory channel(s) 210, 212, 214, 216, 218, 220, 222 that are to operate in the first low-power state (e.g., the self-refresh state) to receive a minimal power baseline. In some examples, the channel power configuring circuitry 630 (FIG. 6) can operate a switch or logic gate to prevent the respective memory channel(s) 210, 212, 214, 216, 218, 220, 222 that are to operate in the second low-power state from receiving power or to cause the respective memory channel(s) 210, 212, 214, 216, 218, 220, 222 that are to operate in the first low-power state to receive a minimal baseline power input. In some examples, the channel power configuring circuitry 630 causes a power controller associated with the memory system 200 to cut off or reduce power being provided to the respective memory channel(s) 210, 212, 214, 216, 218, 220, 222 that are to operate in the first or second low-power state.

At block 820, the example memory power control circuitry 202 controls the low-power state memory channel(s) 210, 212, 214, 216, 218, 220, 222. For example, the power state determining circuitry 310 and/or the memory channel managing circuitry 320 can control the first or second low-power state memory channel(s) 210, 212, 214, 216, 218, 220, 222 based on traffic that the updated hashing policy causes the first or second low-power state memory channel(s) 210, 212, 214, 216, 218, 220, 222 to encounter, as discussed in further detail below. Example instructions that may be used to implement block 820 are described below in connection with FIG. 10. After blocks 804, 812, and 820, the instructions 800 of FIG. 8 end.

Figure 9:
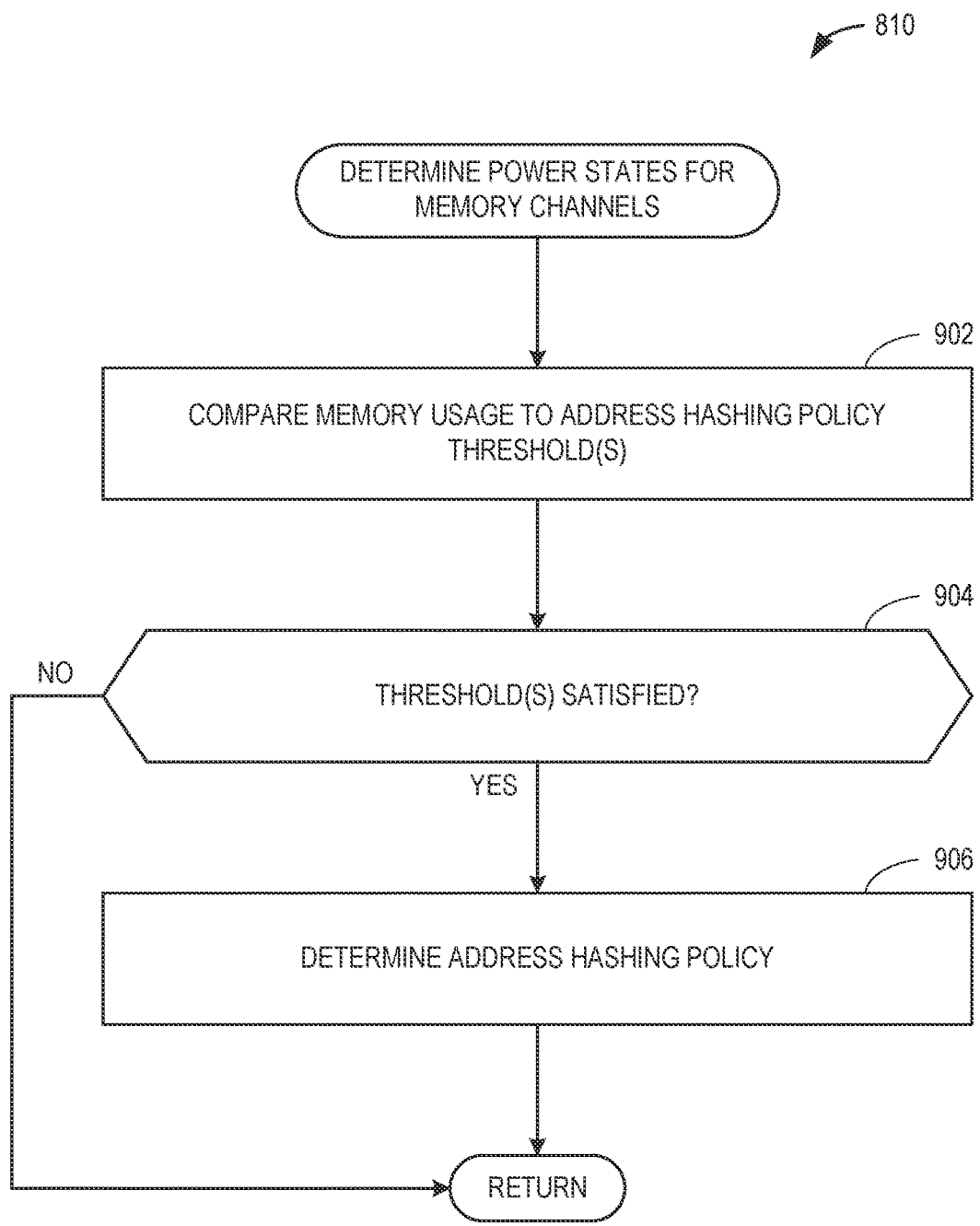
FIG. 9 is a flowchart representative of example machine readable instructions and/or example operations that may be executed by example processor circuitry to at least partially implement the example memory power control circuitry of FIGS. 2 and 3.

FIG. 9 is a flowchart representative of example machine readable instructions and/or example operations 810 that may be executed and/or instantiated by processor circuitry to implement block 810 of FIG. 8 to determine an address hashing policy to utilize to fit the memory usage associated with the user profile. The machine readable instructions and/or the operations 810 of FIG. 9 begin at block 902, at which the example memory power control circuitry 202 compares the memory usage of the user associated with the memory system 200 to one or more of the address hashing policy thresholds. For example, the power state determining circuitry 310 (FIGS. 3 and 4) can perform the comparison between the memory usage data associated with the user profile and the address hashing policy thresholds using data stored in the telemetries database 480 (FIG. 4) and the hashing policy database 470 (FIG. 4). In some examples, the hashing policy determining circuitry 460 (FIG. 4) performs a first comparison between the maximum memory capacity utilized over the predetermined period of time and one or more memory capacity thresholds associated with the address hashing policies. In some examples, the hashing policy determining circuitry 460 performs a second comparison between the maximum bandwidth utilized over the predetermined period of time and one or more bandwidth thresholds associated with the address hashing policies. In some examples, the hashing policy determining circuitry 460 performs a third comparison between the maximum latency encountered over the predetermined period of time and one or more latency thresholds associated with the address hashing policies. Additionally or alternatively, the latencies associated with usage of certain applications or categories of applications can be predetermined and, in turn, the example hashing policy determining circuitry 460 can compare the applications or categories of applications utilized by the user over the predetermined period of time to applications or categories of applications associated with the address hashing policies.

At block 904, the example memory power control circuitry 202 determines whether the memory usage of the user satisfies one or more of the address hashing policy thresholds. For example, the power state determining circuitry 310 can determine whether the memory usage associated with the user profile satisfies one or more of the hashing policy thresholds. In some examples, the hashing policy determining circuitry 460 determines whether the maximum memory capacity utilized by the user over the predetermined period of time satisfies (e.g., is less than) one or more of the capacity thresholds associated with the address hashing policies. In some examples, the hashing policy determining circuitry 460 determines whether the maximum memory bandwidth utilized by the user over the predetermined period of time satisfies (e.g., is less than) one or more of the bandwidth thresholds associated with the address hashing policies. In some examples, the hashing policy determining circuitry 460 determines whether the maximum latency encountered by the user over the predetermined period of time satisfies (e.g., is less than) one or more of the latency thresholds associated with the address hashing policies. In some examples, the hashing policy determining circuitry 460 determines whether the applications or categories of applications utilized by the user matches applications or categories of applications associated with one or more of the address hashing policies. When the memory usage associated with the user profile does not satisfy (e.g., is greater than) all of the address hashing policy thresholds and applications associated with the memory usage do not match the applications associated with the address hashing policies, the operations 810 terminate.

When the memory power control circuitry 202 determines, at block 904, that the memory usage associated with the user profile satisfies one or more of the address hashing policy thresholds, control advances to block 906, at which the memory power control circuitry 202 determines which of the address hashing policies is to be implemented. For example, the power state determining circuitry 310 can determine the address hashing policy to implement based on the address hashing policy threshold(s) satisfied by the memory usage data stored in the telemetries database 480. In some examples, the hashing policy determining circuitry 460 determines which of the address hashing policies to implement based on a quantity and/or type of the address hashing policies thresholds satisfied by the memory usage data. In some examples, the hashing policy determining circuitry 460 determines the address hashing policy associated with the smallest satisfied capacity and/or bandwidth threshold is to be implemented. In some examples, the hashing policy determining circuitry 460 determines the address hashing policy associated with the greatest satisfied latency threshold is to be implemented. In some examples, the hashing policy determining circuitry 460 determines the address hashing policy associated with applications or categories of applications that match the applications or categories of applications associated with the user profile. In some examples, the hashing policy determining circuitry 460 determines the address hashing policy is to be implemented in response to the capacity threshold associated therewith being satisfied, the bandwidth threshold associated therewith being satisfied, the latency threshold associated therewith being satisfied, and/or the applications associated therewith matching the applications associated with the user profile. In some examples, the hashing policy database 470 includes power saving rankings of the address hashing policies. In some examples, the hashing policy determining circuitry 460 determines the hashing policy is to be implemented in response to at least one threshold associated with the hashing policy being satisfied and the hashing policy having the highest ranked power savings of the hashing policies having at least one threshold associated therewith satisfied. Control returns to the instructions or operations 800 of FIG. 8.

Figure 10:
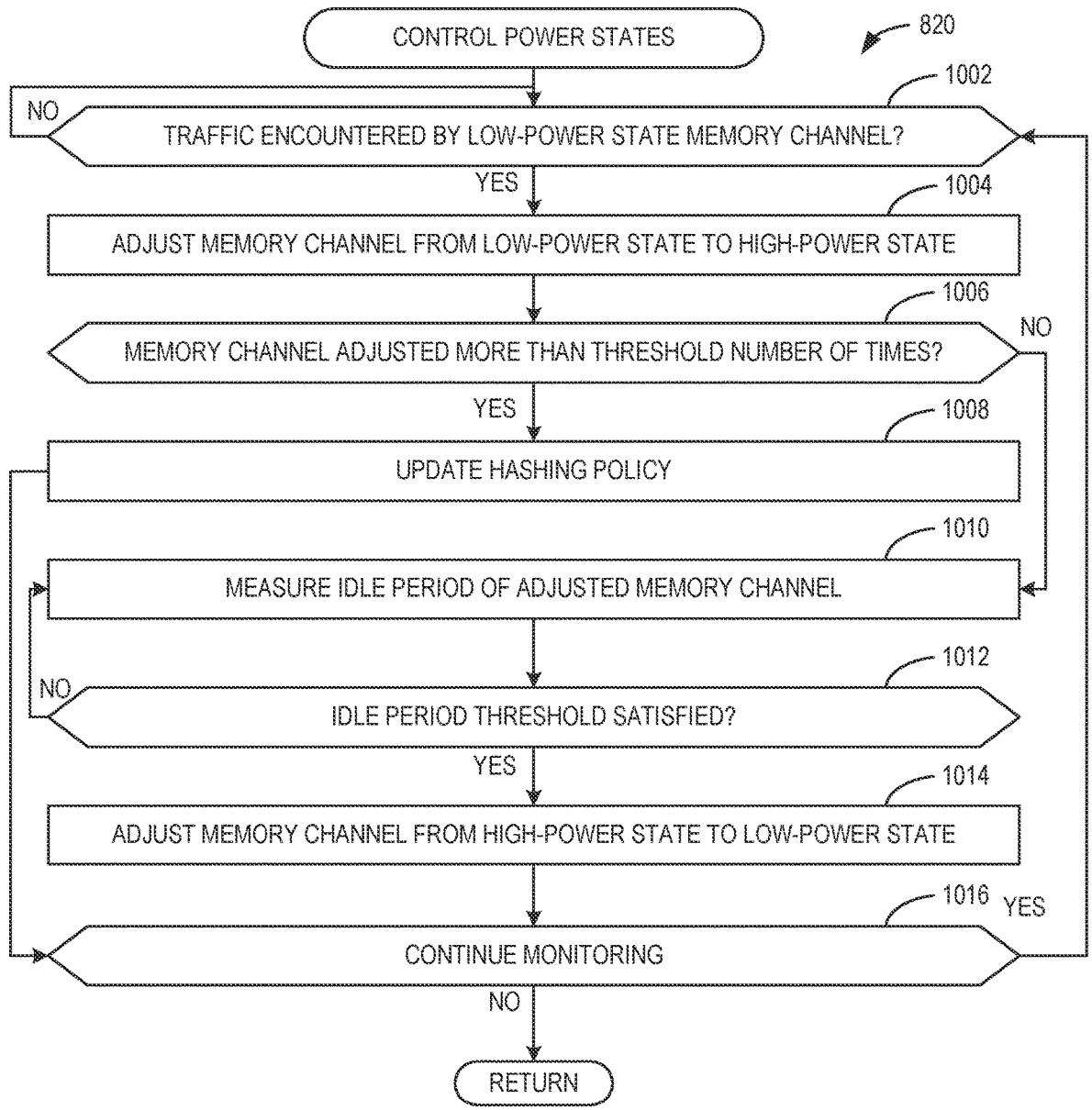
FIG. 10 is a flowchart representative of example machine readable instructions and/or example operations that may be executed by example processor circuitry to at least partially implement the example memory power control circuitry of FIGS. 2 and 3.

FIG. 10 is a flowchart representative of example machine readable instructions and/or example operations 820 that may be executed and/or instantiated by processor circuitry to implement block 820 of FIG. 8 to control a usage of the memory channels 208, 210, 212, 214, 216, 218, 220, 222 (FIG. 2). The machine readable instructions and/or the operations 820 of FIG. 10 begin at block 1002, at which the example memory power control circuitry 202 (FIG. 2) determines whether traffic is encountered by the memory channels 210, 212, 214, 216, 218, 220, 222 (FIG. 2) operating in the low-power state. For example, the memory channel managing circuitry 320 (FIGS. 3 and 6) can identify where the memory directing circuitry 206 (FIG. 2) is directing traffic in response to the memory directing circuitry 206 receiving data or a request via the data processing circuitry 204 (FIG. 2). In some examples, the traffic monitoring circuitry 650 (FIG. 6) monitors for traffic being directed to the memory channels 210, 212, 214, 216, 218, 220, 222 operating in the first or second low-power state. When traffic has not yet been encountered by the memory channels 210, 212, 214, 216, 218, 220, 222 operating in the first or second low-power state, the operations 820 repeat block 1002.

When the memory power control circuitry 202 determines, at block 1002, that one of the memory channels 210, 212, 214, 216, 218, 220, 222 operating in the first or second low-power state has encountered traffic, control advances to block 1004, at which the memory power control circuitry 202 adjusts the respective memory channel 210, 212, 214, 216, 218, 220, 222 from the low-power state to the high-power state. For example, the example memory channel managing circuitry 320 can adjust the respective memory channel 210, 212, 214, 216, 218, 220, 222 from the first or second low-power state to the high-power state. In some examples, the channel power configuring circuitry 630 (FIG. 6) adjusts the respective memory channel 210, 212, 214, 216, 218, 220, 222 from the first or second low-power state to the high-power state by causing more power to be provided to the respective memory channel 210, 212, 214, 216, 218, 220, 222.

At block 1006, the example memory power control circuitry 202 determines whether the power state of the adjusted memory channel 210, 212, 214, 216, 218, 220, 222 has been adjusted more than a threshold number of times within a predetermined period of time. For example, the example memory channel managing circuitry 320 can determine whether the adjusted memory channel 210, 212, 214, 216, 218, 220, 222 has been adjusted more than once within 1 second. In some examples, the channel flagging circuitry 660 (FIG. 6) flags the respective memory channel 210, 212, 214, 216, 218, 220, 222 in response the memory channel 210, 212, 214, 216, 218, 220, 222 being adjusted from the first or second low-power state to the high-power state. Accordingly, the flags may only persist for the predetermined period of time such that the adjustment count refreshes over time. In some examples, the channel power configuring circuitry 630 counts the flags associated with the adjusted memory channel 210, 212, 214, 216, 218, 220, 222 to determine whether the adjusted memory channel 210, 212, 214, 216, 218, 220, 222 has been adjusted more than the threshold number of times within the predetermined period of time. In response to determining that the adjusted memory channel 210, 212, 214, 216, 218, 220, 222 has been adjusted more than the threshold number of times within the predetermined period of time, the channel power configuring circuitry 630 determines the adjusted memory channel 210, 212, 214, 216, 218, 220, 222 is to stay in the high-power state. In turn, the channel power configuring circuitry 630 can transmit a signal indicative of the updated power state to the power state determining circuitry 310. When the memory channel 210, 212, 214, 216, 218, 220, 222 is adjusted more than the threshold number of times within the predetermined period of time, the operations 820 proceed to block 1008. Otherwise, control proceeds to block 1010

At block 1008, the example memory power control circuitry 202 updates the address hashing policy being utilized by the memory directing circuitry 206 to store data. For example, in response to the power state of one of the memory channels 210, 212, 214, 216, 218, 220, 222 being adjusted from the low-power state to the high-power state, the power state determining circuitry 310 determines the updated address hashing policy based on the adjusted memory channel 210, 212, 214, 216, 218, 220, 222. In some examples, the hashing policy determining circuitry 460 (FIG. 4) determines the updated address hashing policy based on a predetermined hashing policy that utilizes the memory channels 208, 210, 212, 214, 216, 218, 220 already operating in the high-power state along with the adjusted memory channel 210, 212, 214, 216, 218, 220, 222. In some examples, the hashing policy determining circuitry 460 determines the updated address hashing policy based on memory usage data stored in the telemetries database 480 (FIG. 4) and hashing policy data stored in the hashing policy database 470 (FIG. 4). In turn, the power state determining circuitry 310 can transmit the updated hashing policy to the memory channel managing circuitry 320. Further, the hashing policy transmitting circuitry 610 can transmit the updated hashing policy to the memory directing circuitry 206. In response to determining the updated hashing policy, control proceeds to block 1016.

At block 1010, the example memory power control circuitry 202 determines an idle period of the adjusted memory channel 210, 212, 214, 216, 218, 220, 222 (e.g., a timespan for which the adjusted memory channel 210, 212, 214, 216, 218, 220, 222 does not encounter activity). For example, the memory channel managing circuitry 320 can measure the idle period. In some examples, the channel flagging circuitry 660 triggers the idle channel timer 670 (FIG. 6) to start in response to the adjusted memory channel 210, 212, 214, 216, 218, 220, 222 being unutilized (e.g., not transporting data).

At block 1012, the example memory power control circuitry 202 determines whether the idle period of the adjusted memory channel 210, 212, 214, 216, 218, 220, 222 satisfies the idle period threshold. For example, the memory channel managing circuitry 320 can determine whether the idle period of the adjusted memory channel 210, 212, 214, 216, 218, 220, 222 satisfies the idle period threshold. In some examples, the channel flagging circuitry 660 determines the idle period of the adjusted memory channel 210, 212, 214, 216, 218, 220, 222 satisfies the idle period threshold in response to the idle channel timer expiring and/or surpassing the idle period threshold. When the idle period of the adjusted memory channel 210, 212, 214, 216, 218, 220, 222 satisfies the idle period threshold, control proceeds to block 1014. Otherwise, control returns to block 1010.

At block 1014, the memory power control circuitry 202 configures the adjusted memory channel 210, 212, 214, 216, 218, 220, 222 to the low-power state. For example, the memory channel managing circuitry 320 can cause the adjusted memory channel 210, 212, 214, 216, 218, 220, 222 to return to the low-power state. In some examples, the channel power configuring circuitry 630 configures the adjusted memory channel 210, 212, 214, 216, 218, 220, 222 to operate in the low-power state.

At block 1016, the example memory power control circuitry 202 determines whether to continue monitoring the traffic encountered by the memory directing circuitry 206. In some examples, the memory power control circuitry 202 continues to monitor the traffic in response at least one of memory channels 208, 210, 212, 214, 216, 218, 220, 222 operating in the low-power state or being flagged. In some examples, the memory power control circuitry 202 stops monitoring the traffic in response to all of the memory channels 208, 210, 212, 214, 216, 218, 220, 222 being adjusted to operate in the high-power state without any of the memory channels 210, 212, 214, 216, 218, 220, 222 being flagged. Control then returns to the instructions or operations of FIG. 8.

FIG. 11 is a second flowchart representative of example machine readable instructions and/or example operations 1100 that may be executed and/or instantiated by processor circuitry to implement the memory power control circuitry 202 (FIGS. 2 and 3) to determine a memory address hashing policy of the memory channels 208, 210, 212, 214, 216, 218, 220, 222 (FIG. 2) and, in turn, enable the memory system 200 (FIG. 2) to operate with a reduced power consumption and increased power efficiency. The machine readable instructions and/or the operations 1100 of FIG. 11 begin at block 1102, at which the example memory power control circuitry 202 (FIGS. 2 and 3) determines memory usage data (e.g., corresponding to a user profile, for a user of the memory system 200). For example, the power state determining circuitry 310 (FIGS. 3 and 4) can determine the memory capacity usage data based on telemetries associated with the memory system 200 and a usage of the memory channels 208, 210, 212, 214, 216, 218, 220, 222. In some examples, the memory usage determining circuitry 430 (FIG. 4) determines the memory usage based on a maximum memory capacity and/or bandwidth utilized by a user over a predetermined period of time (e.g., 1 week, 1 month, 3 months, etc.), a maximum latency encountered over the predetermined period of time, applications utilized over the predetermined period of time, and/or any other memory consumption statistics. In some examples, the memory usage determining circuitry 430 verifies whether the maximum memory capacity, bandwidth, and/or latency or application usage is within the standard usage of the user and, thus, not an outlier. In response to the maximum memory capacity, bandwidth, and/or latency or application usage being an outlier, the memory usage determining circuitry 430 utilizes a next highest memory capacity, bandwidth, and/or latency over the predetermined period of time and/or disregard application usage not within the standard usage of the user. Similarly, the memory usage determining circuitry 430 can again verify the validity of the memory capacity usage based on the telemetries of the memory system 200 and the usage of the memory channels 208, 210, 212, 214, 216, 218, 220, 222.

At block 1104, the example memory power control circuitry 202 determines a memory address hashing policy to be utilized by the memory directing circuitry 206 (FIGS. 2 and 7). For example, the power state determining circuitry 310 can determine the memory address hashing policy based on the memory usage associated with the user profile. In some examples, the hashing policy determining circuitry 460 (FIG. 4) performs a comparison between the memory usage associated with the user profile and one or more thresholds and/or applications or categories of applications associated with the memory address hashing policies to determine the memory address hashing policy to be utilized.

At block 1106, the example memory power control circuitry 202 determines power states for the memory channels 208, 210, 212, 214, 216, 218, 220, 222. For example, the power state determining circuitry 310 can determine the power states for the memory channels 208, 210, 212, 214, 216, 218, 220, 222 based on the determined memory address hashing policy. In some examples, the channel classifying circuitry 450 (FIG. 4) performs a look-up in the hashing policy database 470 (FIG. 4) to determine the power states of the memory channels 208, 210, 212, 214, 216, 218, 220, 222 corresponding to the determined memory address hashing policy. The example instructions and/or operations 1100 end.

FIG. 12 is a flowchart representative of example machine readable instructions and/or example operations 1200 that may be executed and/or instantiated by processor circuitry to implement the memory directing circuitry 206 (FIGS. 2 and 7) to store and/or retrieve data through the memory channels 208, 210, 212, 214, 216, 218, 220, 222 of FIG. 2 and, in turn, enable the memory system 200 of FIG. 2 to operate with a reduced power consumption and increased power efficiency. The machine readable instructions and/or the operations 1200 of FIG. 12 begin at block 1202, at which the example memory directing circuitry 206 utilizes a default address hashing policy to store data from the data processing circuitry 204 (FIG. 2) in the memory channels 208, 210, 212, 214, 216, 218, 220, 222 (FIG. 2). For example, the hashing policy setting circuitry 710 (FIG. 7) can utilize the default address hashing policy to map each of the memory channels 208, 210, 212, 214, 216, 218, 220, 222 to corresponding regions or address locations in which data is stored.

At block 1204, the example memory directing circuitry 206 determines whether a hashing policy update was received. For example, the hashing policy setting circuitry 710 (FIG. 7) can determine whether an updated hashing policy has been received via the memory power control circuitry 202. In response to the example memory directing circuitry 206 receiving an updated hashing policy, control proceeds to block 1206. Otherwise, control advances to block 1208.

At block 1206, the example memory directing circuitry 206 updates the hashing policy. For example, the hashing policy setting circuitry 710 implements the hashing policy indicated by the memory power control circuitry 202.

At block 1208, the example memory directing circuitry 206 determines whether data has been received via the data processing circuitry 204 (FIG. 2). In response to data being received, control proceeds to block 1210. Otherwise, control advances to block 1212.

At block 1210, the example memory directing circuitry 206 stores the received data based on the hashing policy implemented by the hashing policy setting circuitry 710. For example, the data storing circuitry 720 can cause the memory channels 208, 210, 212, 214, 216, 218, 220, 222 to store the data according to the implemented hashing policy.

At block 1212, the example memory directing circuitry 206 determines whether the data processing circuitry 204 has requested data. In response to the data processing circuitry 204 requesting data from the memory channels 208, 210, 212, 214, 216, 218, 220, 222, control proceeds to block 1214. Otherwise, control proceeds to block 1216.

At block 1214, the example memory directing circuitry 206 extracts data based on the hashing policy using one or more of the memory channels 208, 210, 212, 214, 216, 218, 220, 222. For example, the data accessing circuitry 740 (FIG. 7) can utilize one or more of the memory channels 208, 210, 212, 214, 216, 218, 220, 222 to extract the data based on the request received via the data processing circuitry 204.

At block 1216, the example memory directing circuitry 206 determines whether to continue to operate. In response to remaining powered, the memory directing circuitry 206 continues and control returns to block 1204. Otherwise, the instructions or operations 1200 terminate.

Figure 13:
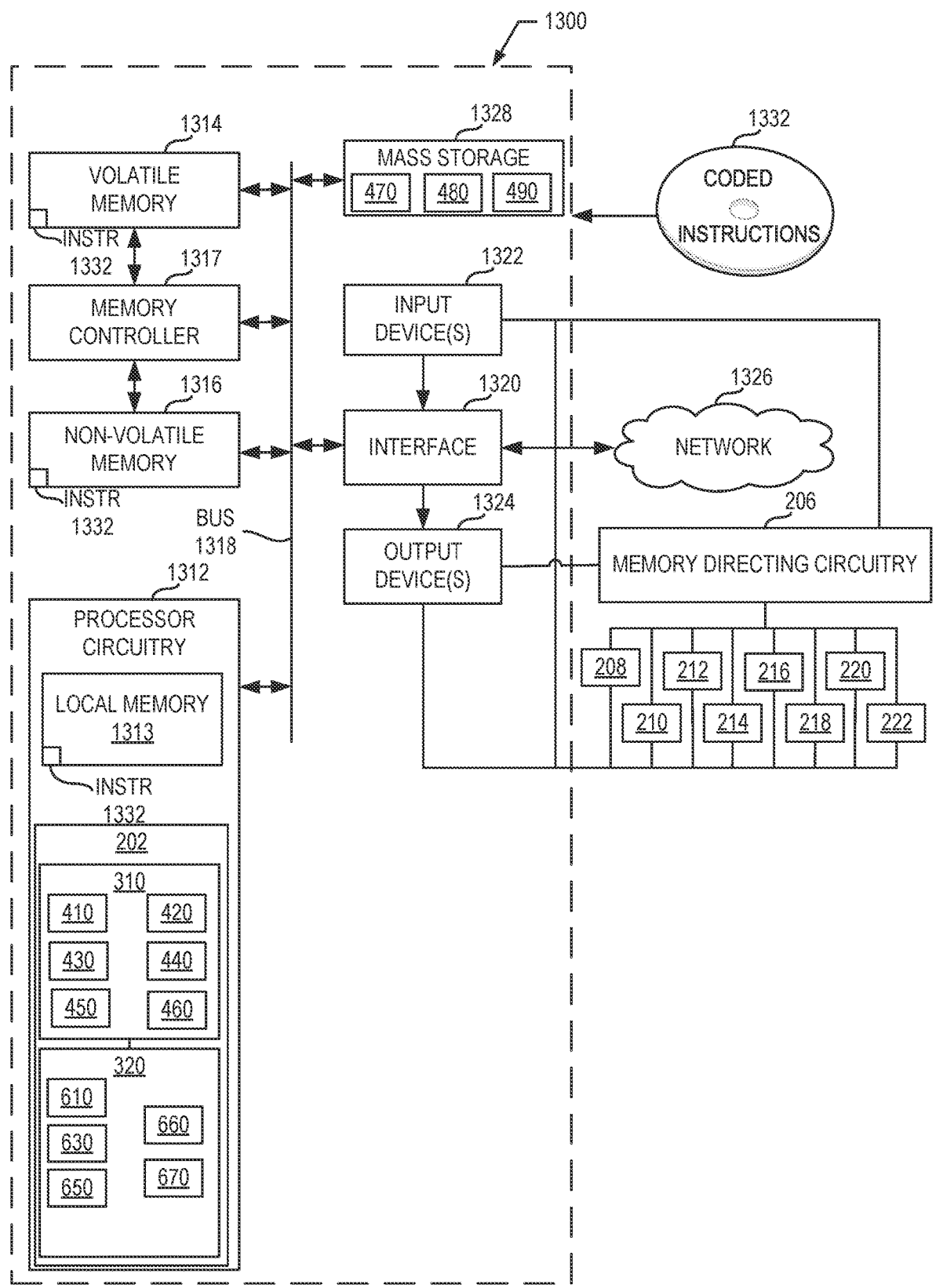
FIG. 13 is a block diagram of an example processing platform including processor circuitry structured to execute the example machine readable instructions and/or the example operations of FIGS. 7, 8, 9, and/or 10 to implement the example memory control system of FIG. 2.

FIG. 13 is a block diagram of an example processor platform 1300 structured to execute and/or instantiate the machine readable instructions and/or the operations of FIGS. 8, 9, 10, and/or 11 to implement the memory power control circuitry 202 of FIG. 2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the memory power control circuitry 202, the power state determining circuitry 310, the memory channel managing circuitry 320, the data collecting circuitry 410, the preference identifying circuitry 420, the memory usage determining circuitry 430, the threshold determining circuitry 440, the channel classifying circuitry 450, the hashing policy determining circuitry 460, the hashing policy transmitting circuitry 610, the channel power configuring circuitry 630, the traffic monitoring circuitry 650, the channel flagging circuitry 660, and the idle channel timer 670.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system. In the illustrated example, the memory directing circuitry 206, the first memory channel 208, the second memory channel 210, the third memory channel 212, the fourth memory channel 214, the fifth memory channel 216, the sixth memory channel 218, the seventh memory channel 220, and the eighth memory channel 222 are in circuit with the input device(s) 1322.

One or more output devices 1324 are also connected to the interface circuitry 1320 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU. In the illustrated example, the memory directing circuitry 206, the first memory channel 208, the second memory channel 210, the third memory channel 212, the fourth memory channel 214, the fifth memory channel 216, the sixth memory channel 218, the seventh memory channel 220, and the eighth memory channel 222 are in circuit with the output device(s) 1324.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In the illustrated example, the mass storage 1328 includes the hashing policy database 470, the telemetries database 480, and the user preference database 490.

The machine executable instructions 1332, which may be implemented by the machine readable instructions of FIGS. 8, 9, 10, and 11, may be stored in the mass storage device 1328, in the volatile memory 1314, in the non-volatile memory 1316, and/or on a removable non-transitory computer readable storage medium such as a CD or DVD.

FIG. 14 is a block diagram of an example processor platform 1400 structured to execute and/or instantiate the machine readable instructions and/or the operations of FIG. 12 to implement the memory directing circuitry 206 of FIGS. 2 and 7. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the hashing policy setting circuitry 710, the data storing circuitry 720, the data sorting circuitry 730, and the data accessing circuitry 740.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user to enter data and/or commands into the processor circuitry 1412. The input device(s) 422 can be implemented by, for example, an audio sensor, a microphone, a camera (still or video), a keyboard, a button, a mouse, a touchscreen, a track-pad, a trackball, an isopoint device, and/or a voice recognition system. In the illustrated example, the memory power control circuitry 202, the data processing circuitry 204, the first memory channel 208, the second memory channel 210, the third memory channel 212, the fourth memory channel 214, the fifth memory channel 216, the sixth memory channel 218, the seventh memory channel 220, and the eighth memory channel 222 are coupled to the input device(s) 1422.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU. In the illustrated example, the memory power control circuitry 202, the data processing circuitry 204, the first memory channel 208, the second memory channel 210, the third memory channel 212, the fourth memory channel 214, the fifth memory channel 216, the sixth memory channel 218, the seventh memory channel 220, and the eighth memory channel 222 are coupled to the output device(s) 1424.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1432, which may be implemented by the machine readable instructions of FIG. 12, may be stored in the mass storage device 1428, in the volatile memory 1414, in the non-volatile memory 1416, and/or on a removable non-transitory computer readable storage medium such as a CD or DVD.

FIG. 15 is a block diagram of an example implementation of the processor circuitry 1312 of FIG. 13 and the processor circuitry 1412 of FIG. 14. In this example, the processor circuitry 1312 of FIG. 13 and the processor circuitry 1412 of FIG. 14 are implemented by a general purpose microprocessor 1500. The general purpose microprocessor circuitry 1500 execute some or all of the machine readable instructions of the flowchart of FIGS. 8, 9, 10, 11, and/or 12 to effectively instantiate the circuitry of FIGS. 13 and 14 as logic circuits to perform the operations corresponding to those machine readable instructions. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 8, 9, 10, 11, and 12.

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L28, 9, 10, 11, and 12 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1314, 1316 of FIG. 13, the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 16 is a block diagram of another example implementation of the processor circuitry 1312 of FIG. 13 and/or the processor circuitry 1412 of FIG. 14. In this example, the processor circuitry 1312 and the processor circuitry 1412 are implemented by FPGA circuitry 1600. The FPGA circuitry 1600 can be used, for example, to perform operations that could otherwise be performed by the example microprocessor 1500 of FIG. 5 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 8, 9, 10, 11, and 12 but whose interconnections and logic circuitry are fixed once fabricated), the FPGA circuitry 1600 of the example of FIG. 6 includes interconnections and logic circuitry that may be configured and/or interconnected in different ways after fabrication to instantiate, for example, some or all of the machine readable instructions represented by the flowchart of FIGS. 8, 9, 10, 11, and 12. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowchart of FIGS. 8, 9, 10, 11, and 12. As such, the FPGA circuitry 1600 may be structured to effectively instantiate some or all of the machine readable instructions of the flowchart of FIGS. 8, 9, 10, 11, and 12 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 8, 9, 10, 11, and 12 faster than the general purpose microprocessor can execute the same.

In the example of FIG. 6, the FPGA circuitry 1600 is structured to be programmed (and/or reprogrammed one or more times) by an end user by a hardware description language (HDL) such as Verilog. The FPGA circuitry 1600 of FIG. 6, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 5. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 8, 9, 10, 11, and 12 and/or other desired operations. The logic gate circuitry 1608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 6 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1312 of FIG. 13 and the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1312 of FIG. 13 and the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowchart of FIGS. 8, 9, 10, 11, and 12 may be executed by one or more of the cores 1502 of FIG. 15 and a second portion of the machine readable instructions represented by the flowchart of FIGS. 8, 9, 10, 11, and 12 may be executed by the FPGA circuitry 1600 of FIG. 16.

In some examples, the processor circuitry 1312 of FIG. 13 and the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1312 of FIG. 13 and the processor circuitry 1412 of FIG. 14, which may be in one or more packages. For example, the XPU may include a CPU in one package, a DSP in another package, a GPU in yet another package, and an FPGA in still yet another package.

A block diagram illustrating an example software distribution platform 1705 to distribute software such as the example machine readable instructions 1332 of FIG. 13 and the example machine readable instructions 1432 of FIG. 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1332 of FIG. 13 and the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1332 of FIG. 13 and the example machine readable instructions 1432 of FIG. 14, which may correspond to the example machine readable instructions 800, 810, 820, 1100, 1200 of FIGS. 8, 9, 10, 11, and 12, as described above. The one or more servers of the example software distribution platform 1705 are in communication with a network 1710, which may correspond to any one or more of the Internet and/or any of the example networks 1315, 1415 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 of FIG. 13 and the example machine readable instructions 1432 of FIG. 14 from the software distribution platform 1705. For example, the software, which may correspond to the example machine readable instructions 800, 810, 820, 1100, 1200 of FIGS. 8, 9, 10, 11, and 12, may be downloaded to the example processor platform 1300, 1400, which is to execute the machine readable instructions 1332, 1432 to implement the memory power control circuitry 202 and the memory directing circuitry 206, respectively. In some example, one or more servers of the software distribution platform 1705 periodically offer, transmit, and/or force updates to the software (e.g., the example machine readable instructions 1332 of FIG. 13 and the example machine readable instructions 1432 of FIG. 14) to ensure improvements, patches, updates, etc., are distributed and applied to the software at the end user devices.

FIG. 18 shows an example state diagram 1800 representative of example control of low-power state memory channels performed by the example memory power control circuitry 202 (FIGS. 2 and 3). Specifically, the example state diagram 1800 is associated with control of ones of the memory channels 210, 212, 214, 216, 218, 220, 222 (FIG. 2) that the example memory power control circuitry 202 initially configures to operate in the first or second low-power state.

In the illustrated example of FIG. 18, an off power state 1802 represents when the channel classifying circuitry 450 (FIG. 4) determines the respective memory channel 210, 212, 214, 216, 218, 220, 222 is to operate in a first low-power state (e.g., the power off state). Also in example FIG. 18, a self-refresh power state 1804 represents when the channel classifying circuitry 450 determines the respective memory channel 210, 212, 214, 216, 218, 220, 222 is to operate in a second low-power state (e.g., the self-refresh state).

At the off power state 1802, the example channel power configuring circuitry 630 (FIG. 6) configures the respective memory channel 210, 212, 214, 216, 218, 220, 222 to operate in the first low-power state. The example traffic monitoring circuitry 650 (FIG. 6) determines whether pending traffic is directed toward a region associated with the respective memory channel 210, 212, 214, 216, 218, 220, 222. In response to the traffic monitoring circuitry 650 determining the pending traffic is directed toward the region associated with the respective memory channel 210, 212, 214, 216, 218, 220, 222, control moves to an on power state 1806. In response to the example traffic monitoring circuitry 650 determining there is no pending traffic or the pending traffic is not directed toward the region associated with the respective memory channel 210, 212, 214, 216, 218, 220, 222, control remains at the off power state 1802 and the traffic monitoring circuitry 650 continues to monitor for traffic directed toward the region associated with the respective memory channel 210, 212, 214, 216, 218, 220, 222.

At the on power state 1806, the example channel power configuring circuitry 630 configures the respective memory channel 210, 212, 214, 216, 218, 220, 222 to operate in a high-power state (e.g., a power-on state). Accordingly, the respective memory channel 210, 212, 214, 216, 218, 220, 222 can handle traffic to and/or from a memory region associated therewith. When the respective memory channel 210, 212, 214, 216, 218, 220, 222 is idle (e.g., inactive, unutilized, etc.), the idle channel timer 670 (FIG. 6) initiates and measures a length of time that the respective memory channel 210, 212, 214, 216, 218, 220, 222 remains idle. In response to the respective memory channel 210, 212, 214, 216, 218, 220, 222 being idle for longer than a first idle period threshold, control moves to the self-refresh state 1804.

At the self-refresh state 1804, the example channel power configuring circuitry 630 configures the respective memory channel 210, 212, 214, 216, 218, 220, 222 to operate in the second low-power state (e.g., the self-refresh state). Further, the example traffic monitoring circuitry 650 monitors for traffic associated with the respective memory channel 210, 212, 214, 216, 218, 220, 222. In response to the example respective memory channel 210, 212, 214, 216, 218, 220, 222 not being associated with traffic, the example idle channel timer 670 continues to monitor the idle period associated with the respective memory channel 210, 212, 214, 216, 218, 220, 222. Additionally, the example traffic monitoring circuitry 650 determines whether the memory region associated with the respective memory channel 210, 212, 214, 216, 218, 220, 222 is empty. In response to the respective memory channel 210, 212, 214, 216, 218, 220, 222 being associated with pending traffic, control moves to the on power state 1806. In response to the memory region associated with the respective memory channel 210, 212, 214, 216, 218, 220, 222 being empty and the respective memory channel 210, 212, 214, 216, 218, 220, 222 being idle for more than a second idle threshold, control moves to a block state 1808. In response to the respective memory channel not being associated with traffic and the memory region associated with the respective memory channel 210, 212, 214, 216, 218, 220, 222 not being empty, the control remains at the self-refresh state 1804.

At the block state 1808, the example channel power configuring circuitry 630 blocks traffic to the respective memory channel 210, 212, 214, 216, 218, 220, 222. In response to the example traffic monitoring circuitry 650 detecting traffic associated with the respective memory channel 210, 212, 214, 216, 218, 220, 222, control proceeds to the self-refresh state 1804. In response to the example traffic monitoring circuitry 650 not detecting traffic associated with the respective memory channel 210, 212, 214, 216, 218, 220, 222, control proceeds to the off power state 1802.

Disclosed systems, methods, apparatus, and articles of manufacture improve the power efficiency of using a computing device by reducing battery power consumed by memory channels. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to adapt memory channel usage on a per-user basis are disclosed herein. Further examples and combinations thereof include the following:

Example 1 includes an apparatus comprising at least one memory, instructions, and processor circuitry to execute the instructions to determine memory usage data associated with a user profile, determine an address hashing policy based on the memory usage data, and determine power states of memory channels based on the address hashing policy.

Example 2 includes the apparatus of example 1, wherein the processor circuitry is to execute the instructions to perform at least one of a first comparison between the memory usage data and at least one threshold associated with the address hashing policy, or a second comparison between the memory usage data and an application or a category of applications associated with the address hashing policy, and determine the address hashing policy based on at least one of the first comparison or the second comparison.

Example 3 includes the apparatus of example 2, wherein the at least one threshold includes at least one of a capacity threshold, a bandwidth threshold, or a latency threshold.

Example 4 includes the apparatus of example 1, wherein the memory usage data includes at least one of a maximum memory bandwidth associated with the user profile, a maximum memory capacity usage associated with the user profile, a maximum memory latency associated with the user profile, or applications associated with the user profile.

Example 5 includes the apparatus of example 4, wherein the processor circuitry is to execute the instructions to determine the address hashing policy in response to the maximum memory bandwidth associated with the user profile satisfying a bandwidth threshold.

Example 6 includes the apparatus of example 1, wherein the power states include a high-power state and a low-power state, wherein the memory channels include a first memory channel, wherein the processor circuitry is to execute the instructions to determine a usage frequency of the first memory channel based on the address hashing policy, and cause the first memory channel to operate in the low-power state in response to the usage frequency satisfying a usage frequency threshold associated with the low-power state.

Example 7 includes the apparatus of example 6, wherein the low-power state is a first low-power state and the usage frequency threshold is a first usage frequency threshold, wherein the power states include a second low-power state, wherein the processor circuitry is to execute the instructions to in response to the usage frequency satisfying the first usage frequency threshold and a second usage frequency threshold, cause the first memory channel to operate in the second low-power state, in response to the usage frequency satisfying the first usage frequency threshold and not satisfying the second usage frequency threshold, cause the first memory channel to operate in the first low-power state, and in response to the usage frequency not satisfying the first usage frequency threshold nor the second usage frequency threshold, cause the first memory channel to operate in the high-power state.

Example 8 includes the apparatus of example 1, wherein the power states include a high-power state and a low-power state, wherein the memory channels include a first memory channel in the low-power state, wherein the processor circuitry is to execute the instructions to adjust the first memory channel to the high-power state in response to the address hashing policy causing the first memory channel to encounter traffic.

Example 9 includes the apparatus of example 8, wherein the processor circuitry is to execute the instructions to in response to the first memory channel being adjusted from the low-power state to the high-power state, measure an idle time of the first memory channel, and in response to the idle time satisfying an idle time threshold, adjust the first memory channel to the low-power state.

Example 10 includes a non-transitory machine executable medium comprising instructions that, when executed, cause one or more processors to at least determine memory usage data associated with a user profile, perform at least one of (i) a first comparison between the memory usage data and at least one threshold associated with address hashing policies, or (ii) a second comparison between the memory usage data and applications associated with respective ones of the address hashing policies, and determine an address hashing policy to implement based on at least one of the first comparison or the second comparison.

Example 11 includes the non-transitory machine executable medium of example 10, wherein the instructions, when executed, cause the one or more processors to determine whether to configure one or more memory channels to operate in a low-power state based on the address hashing policy.

Example 12 includes the non-transitory machine executable medium of example 11, wherein the memory channels include a first memory channel, wherein the instructions, when executed, cause the one or more processors to configure the first memory channel to the low-power state, and adjust the first memory channel to a high-power state in response detecting traffic directed towards the first memory channel.

Example 13 includes the non-transitory machine executable medium of example 12, wherein the low-power state is a first low-power state, wherein the instructions, when executed, cause the one or more processors to in response to the first memory channel being adjusted to the high-power state, measure an idle period of the first memory channel, in response to the idle period satisfying an idle period threshold and a storage space associated with the first memory channel being empty, adjust the first memory channel to the first low-power state, and in response to the idle period satisfying the idle period threshold and the storage space associated with the first memory channel not being empty, adjust the first memory channel to a second low-power state.

Example 14 includes the non-transitory machine executable medium of example 13, wherein the second low-power state utilizes more power than the first low-power state.

Example 15 includes the non-transitory machine executable medium of example 11, wherein the memory channels include a first memory channel, wherein the instructions, when executed, cause the one or more processors to determine a usage frequency of the first memory channel associated with the address hashing policy, and cause the first memory channel to operate in the low-power state in response to the usage frequency satisfying a usage frequency threshold associated with the low-power state.

Example 16 includes the non-transitory machine executable medium of example 10, wherein the instructions, when executed, cause the one or more processors to perform the first comparison, wherein the at least one threshold is in a first set of thresholds associated with a first address hashing policy and a second set of thresholds associated with a second address hashing policy, the first set of thresholds including two or more of a first capacity threshold, a first bandwidth threshold, or a first latency threshold.

Example 17 includes the non-transitory machine executable medium of example 16, wherein the instructions, when executed, cause the one or more processors to configure one of a plurality of memory channels to operate in a low-power state in response to the at least one threshold in the first set of thresholds being satisfied, and configure more than one of the memory channels to operate in the low-power state in response to the at least one threshold in the second set of thresholds being satisfied.

Example 18 includes the non-transitory machine executable medium of example 10, wherein the memory usage data includes at least one of a maximum capacity utilized over a period of time, a maximum bandwidth utilized over the period of time, or a maximum latency encountered over the period of time.

Example 19 includes an apparatus comprising means for determining a memory usage corresponding to a user profile, means for determining an address hashing policy to utilize to store data based on the memory usage, and means for adjusting power states for memory channels based on the address hashing policy.

Example 20 includes the apparatus of example 19, further including means for comparing to perform at least one of a first comparison between the memory usage and at least one threshold associated with the address hashing policy, or a second comparison between the memory usage and an application or a category of applications associated with the address hashing policy, wherein the address hashing policy is determined based on at least one of the first comparison or the second comparison.

Example 21 includes the apparatus of example 20, wherein the at least one threshold includes at least one of a capacity threshold, a bandwidth threshold, or a latency threshold.

Example 22 includes the apparatus of example 19, wherein the memory usage includes at least one of a maximum memory bandwidth associated with the user profile, a maximum memory capacity usage associated with the user profile, a maximum memory latency associated with the user profile, or applications associated with the user profile.

Example 23 includes the apparatus of example 22, wherein the means for determining the address hashing policy is to determine the address hashing policy in response to the maximum memory bandwidth associated with the user profile satisfying a bandwidth threshold.

Example 24 includes the apparatus of example 19, wherein the power states include a high-power state and a low-power state, wherein the memory channels include a first memory channel, further including means for determining a usage frequency of the first memory channel corresponding to the address hashing policy, and means for causing the first memory channel to operate in the low-power state in response to the usage frequency satisfying a usage frequency threshold associated with the low-power state.

Example 25 includes the apparatus of example 24, wherein the low-power state is a first low-power state and the usage frequency threshold is a first usage frequency threshold, wherein the power states include a second low-power state, wherein the means for adjusting the power states of the memory channels is to in response to the usage frequency satisfying the first usage frequency threshold and a second usage frequency threshold, cause the first memory channel to operate in the second low-power state, in response to the usage frequency satisfying the first usage frequency threshold and not satisfying the second usage frequency threshold, cause the first memory channel to operate in the first low-power state, and in response to the usage frequency not satisfying the first usage frequency threshold nor the second usage frequency threshold, cause the first memory channel to operate in the high-power state.

Example 26 includes the apparatus of example 19, wherein the power states include a high-power state and a low-power state, wherein the memory channels include a first memory channel in the low-power state, further including means for monitoring for traffic to the memory channels, wherein the means for adjusting the power states of the memory channels is to adjust the first memory channel to the high-power state in response to the means for monitoring for the traffic detecting the traffic to the first memory channel.

Example 27 includes the apparatus of example 26, further including means for measuring an idle time of the first memory channel in response to the first memory channel being adjusted from the low-power state to the high-power state, wherein the means for adjusting the power states of the memory channels is to adjust the first memory channel to the low-power state in response to the idle time satisfying an idle time threshold.

Example 28 includes a method comprising determining memory usage data corresponding to a user profile, determining an address hashing policy based on the memory usage data, and determining power states for memory channels based on the address hashing policy.

Example 29 includes the method of example 28, further including performing at least one of a first comparison between the memory usage data and at least one threshold associated with the address hashing policy, or a second comparison between the memory usage data and an application or a category of applications associated with the address hashing policy, and determining the address hashing policy based on at least one of the first comparison or the second comparison.

Example 30 includes the method of example 29, wherein the at least one threshold includes at least one of a capacity threshold, a bandwidth threshold, or a latency threshold.

Example 31 includes the method of example 28, wherein the memory usage data includes at least one of a maximum memory bandwidth associated with the user profile, a maximum memory capacity usage associated with the user profile, a maximum memory latency associated with the user profile, or applications associated with the user profile.

Example 32 includes the method of example 31, wherein the determining of the address hashing policy is in response to the maximum memory bandwidth associated with the user profile satisfying a bandwidth threshold.

Example 33 includes the method of example 28, wherein the power states include a high-power state and a low-power state, wherein the memory channels include a first memory channel, further including determining a usage frequency of the first memory channel associated with the address hashing policy, and causing the first memory channel to operate in the low-power state in response to the usage frequency satisfying a usage frequency threshold associated with the low-power state.

Example 34 includes the method of example 33, wherein the low-power state is a first low-power state and the usage frequency threshold is a first usage frequency threshold, wherein the power states include a second low-power state, further including in response to the usage frequency satisfying the first usage frequency threshold and a second usage frequency threshold, causing the first memory channel to operate in the second low-power state, in response to the usage frequency satisfying the first usage frequency threshold and not satisfying the second usage frequency threshold, causing the first memory channel to operate in the first low-power state, and in response to the usage frequency not satisfying the first usage frequency threshold nor the second usage frequency threshold, causing the first memory channel to operate in the high-power state.

Example 35 includes the method of example 28, wherein the power states include a high-power state and a low-power state, wherein the memory channels include a first memory channel in the low-power state, further including adjusting the first memory channel to the high-power state in response to the address hashing policy causing the first memory channel to encounter traffic.

Example 36 includes the method of example 35, further including in response to the first memory channel being adjusted from the low-power state to the high-power state, measuring an idle time of the first memory channel, and in response to the idle time satisfying an idle time threshold, adjusting the first memory channel to the low-power state.

Example 37 includes an apparatus comprising memory usage determining circuitry to determine memory usage data corresponding to a user profile, hashing policy determining circuitry to determine an address hashing policy to utilize based on the memory usage data, and channel classifying circuitry to determine power states for memory channels based on the address hashing policy.

Example 38 includes the apparatus of example 37, wherein the hashing policy determining circuitry is to perform at least one of a first comparison between the memory usage data and at least one threshold associated with the address hashing policy, or a second comparison between the memory usage data and an application or a category of applications associated with the address hashing policy, and determine the address hashing policy based on at least one of the first comparison or the second comparison.

Example 39 includes the apparatus of example 38, wherein the hashing policy determining circuitry is to perform the first comparison and the second comparison to determine the address hashing policy.

Example 40 includes the apparatus of example 38, wherein the at least one threshold includes at least one of a capacity threshold, a bandwidth threshold, or a latency threshold.

Example 41 includes the apparatus of example 37, wherein the memory usage data includes at least one of a maximum memory bandwidth corresponding to the user profile, a maximum memory capacity usage corresponding to the user profile, a maximum memory latency corresponding to the user profile, or applications corresponding to the user profile.

Example 42 includes the apparatus of example 41, wherein the hashing policy determining circuitry is to determine the address hashing policy in response to the maximum memory bandwidth associated with the user profile satisfying a bandwidth threshold.

Example 43 includes the apparatus of example 37, wherein the power states include a high-power state and a low-power state, wherein the memory channels include a first memory channel, wherein the channel classifying circuitry is to determine a usage frequency of the first memory channel associated with the address hashing policy, and cause the first memory channel to operate in the low-power state in response to the usage frequency satisfying a usage frequency threshold associated with the low-power state.

Example 44 includes the apparatus of example 43, further including traffic monitoring circuitry to detect traffic directed to the first memory channel, and channel power configuring circuitry to adjust the first memory channel from the low-power state to the high-power state in response to the traffic monitoring circuitry detecting the traffic.

Example 45 includes the apparatus of example 43, wherein the low-power state is a first low-power state and the usage frequency threshold is a first usage frequency threshold, wherein the power states include a second low-power state, wherein the channel classifying circuitry is to in response to the usage frequency satisfying the first usage frequency threshold and a second usage frequency threshold, cause the first memory channel to operate in the second low-power state, in response to the usage frequency satisfying the first usage frequency threshold and not satisfying the second usage frequency threshold, cause the first memory channel to operate in the first low-power state, and in response to the usage frequency not satisfying the first usage frequency threshold nor the second usage frequency threshold, cause the first memory channel to operate in the high-power state.

Example 46 includes the apparatus of example 37, wherein the power states include a high-power state and a low-power state, wherein the memory channels include a first memory channel in the low-power state, further including channel power configuring circuitry to adjust the first memory channel to the high-power state in response to the address hashing policy causing the first memory channel to encounter traffic.

Example 47 includes the apparatus of example 46, further including an idle channel timer to measure an idle period of a second memory channel in response to the first memory channel being adjusted from the low-power state to the high-power state, and channel flagging circuitry to compare the idle period to an idle period threshold, the channel power configuring circuitry to cause the first memory channel to return to operate in the low-power state in response to the idle period satisfying the idle period threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
instructions; and
processor circuitry to execute the instructions to:
   determine memory usage data associated with a user profile, the memory usage data including at least one of a maximum memory bandwidth associated with the user profile, a maximum memory capacity usage associated with the user profile, a maximum memory latency associated with the user profile, or applications associated with the user profile;
   determine an address hashing policy based on the memory usage data; and
   determine power states of memory channels based on the address hashing policy.

2. The apparatus of claim 1, wherein the applications associated with the user profile are first applications, wherein the processor circuitry is to execute the instructions to:
   perform at least one of a first comparison between the memory usage data and at least one threshold associated with the address hashing policy, or a second comparison between the memory usage data and an application or a category of second applications associated with the address hashing policy; and
   determine the address hashing policy based on at least one of the first comparison or the second comparison.

3. The apparatus of claim 2, wherein the at least one threshold includes at least one of a capacity threshold, a bandwidth threshold, or a latency threshold.

4. The apparatus of claim 1, wherein the processor circuitry is to execute the instructions to determine the address hashing policy in response to the maximum memory bandwidth associated with the user profile satisfying a bandwidth threshold.

5. The apparatus of claim 1, wherein the power states include a high-power state and a low-power state, wherein the memory channels include a first memory channel, wherein the processor circuitry is to execute the instructions to:
   determine a usage frequency of the first memory channel based on the address hashing policy; and
   cause the first memory channel to operate in the low-power state in response to the usage frequency satisfying a usage frequency threshold associated with the low-power state.

6. The apparatus of claim 5, wherein the low-power state is a first low-power state and the usage frequency threshold is a first usage frequency threshold, wherein the power states include a second low-power state, wherein the processor circuitry is to execute the instructions to:
   in response to the usage frequency satisfying the first usage frequency threshold and a second usage frequency threshold, cause the first memory channel to operate in the second low-power state;
   in response to the usage frequency satisfying the first usage frequency threshold and not satisfying the second usage frequency threshold, cause the first memory channel to operate in the first low-power state; and
   in response to the usage frequency not satisfying the first usage frequency threshold nor the second usage frequency threshold, cause the first memory channel to operate in the high-power state.

7. An apparatus comprising:
at least one memory;
instructions; and
programmable circuitry to execute the instructions to:
   determine memory usage data associated with a user profile;
   determine an address hashing policy based on the memory usage data;
   determine power states of memory channels based on the address hashing policy, wherein the power states include a high-power state and a low-power state, wherein the memory channels include a first memory channel in the low-power state; and
   adjust the first memory channel to the high-power state in response to the address hashing policy causing the first memory channel to encounter traffic.

8. The apparatus of claim 7, wherein the processor programmable circuitry is to execute the instructions to:
   in response to the first memory channel being adjusted from the low-power state to the high-power state, measure an idle time of the first memory channel; and
   in response to the idle time satisfying an idle time threshold, adjust the first memory channel to the low-power state.

9. A non-transitory machine executable medium comprising instructions that, when executed, cause one or more processors to at least:
   determine memory usage data associated with a user profile;
   perform at least one of (i) a first comparison between the memory usage data and at least one threshold associated with address hashing policies, or (ii) a second comparison between the memory usage data and applications associated with respective ones of the address hashing policies; and
   determine an address hashing policy to implement based on at least one of the first comparison or the second comparison.

10. The non-transitory machine executable medium of claim 9, wherein the instructions, when executed, cause the one or more processors to determine whether to configure one or more memory channels to operate in a low-power state based on the address hashing policy.

11. The non-transitory machine executable medium of claim 10, wherein the memory channels include a first memory channel, wherein the instructions, when executed, cause the one or more processors to:
   configure the first memory channel to the low-power state; and
   adjust the first memory channel to a high-power state in response detecting traffic directed towards the first memory channel.

12. The non-transitory machine executable medium of claim 11, wherein the low-power state is a first low-power state, wherein the instructions, when executed, cause the one or more processors to:

in response to the first memory channel being adjusted to the high-power state, measure an idle period of the first memory channel;

in response to the idle period satisfying an idle period threshold and a storage space associated with the first memory channel being empty, adjust the first memory channel to the first low-power state; and in response to the idle period satisfying the idle period threshold and the storage space associated with the first memory channel not being empty, adjust the first memory channel to a second low-power state.

13. The non-transitory machine executable medium of claim 12, wherein the second low-power state utilizes more power than the first low-power state.

14. The non-transitory machine executable medium of claim 10, wherein the memory channels include a first memory channel, wherein the instructions, when executed, cause the one or more processors to:

determine a usage frequency of the first memory channel associated with the address hashing policy; and cause the first memory channel to operate in the low-power state in response to the usage frequency satisfying a usage frequency threshold associated with the low-power state.

15. The non-transitory machine executable medium of claim 9, wherein the instructions, when executed, cause the one or more processors to perform the first comparison, wherein the at least one threshold is in a first set of thresholds associated with a first address hashing policy and a second set of thresholds associated with a second address hashing policy, the first set of thresholds including two or more of a first capacity threshold, a first bandwidth threshold, or a first latency threshold.

16. The non-transitory machine executable medium of claim 15, wherein the instructions, when executed, cause the one or more processors to:

configure one of a plurality of memory channels to operate in a low-power state in response to the at least one threshold in the first set of thresholds being satisfied; and configure more than one of the memory channels to operate in the low-power state in response to the at least one threshold in the second set of thresholds being satisfied.

17. The non-transitory machine executable medium of claim 9, wherein the memory usage data includes at least one of a maximum capacity utilized over a period of time, a maximum bandwidth utilized over the period of time, or a maximum latency encountered over the period of time.

18. An apparatus comprising:

means for determining a memory usage corresponding to a user profile;

means for determining an address hashing policy to utilize to store data based on the memory usage;

means for adjusting power states for memory channels based on the address hashing policy, the power states including a high-power state and a low-power state, the memory channels include a first memory channel; and means for determining a usage frequency of the first memory channel corresponding to the address hashing policy, the means for adjusting the power states to cause the first memory channel to operate in the low-power state in response to the usage frequency satisfying a usage frequency threshold associated with the low-power state.

19. The apparatus of claim 18, further including means for comparing to perform at least one of a first comparison between the memory usage and at least one threshold associated with the address hashing policy, or a second comparison between the memory usage and an application or a category of applications associated with the address hashing policy, wherein the address hashing policy is determined based on at least one of the first comparison or the second comparison.

20. The apparatus of claim 19, wherein the at least one threshold includes at least one of a capacity threshold, a bandwidth threshold, or a latency threshold.

21. The apparatus of claim 18, wherein the memory usage includes at least one of a maximum memory bandwidth associated with the user profile, a maximum memory capacity usage associated with the user profile, a maximum memory latency associated with the user profile, or applications associated with the user profile.

22. The apparatus of claim 21, wherein the means for determining the address hashing policy is to determine the address hashing policy in response to the maximum memory bandwidth associated with the user profile satisfying a bandwidth threshold.

23. The apparatus of claim 19, wherein the low-power state is a first low-power state and the usage frequency threshold is a first usage frequency threshold, wherein the power states include a second low-power state, wherein the means for adjusting the power states of the memory channels is to:

in response to the usage frequency satisfying the first usage frequency threshold and a second usage frequency threshold, cause the first memory channel to operate in the second low-power state;

in response to the usage frequency satisfying the first usage frequency threshold and not satisfying the second usage frequency threshold, cause the first memory channel to operate in the first low-power state; and in response to the usage frequency not satisfying the first usage frequency threshold nor the second usage frequency threshold, cause the first memory channel to operate in the high-power state.

* * * * *

UNITED STATES PATENT AND TRADEMARK OFFICE
CERTIFICATE OF CORRECTION

| | | |
|---|---|---|
| PATENT NO. | : 12,430,060 B2 | Page 1 of 1 |
| APPLICATION NO. | : 17/558353 | |
| DATED | : September 30, 2025 | |
| INVENTOR(S) | : Dai et al. | |

It is certified that error appears in the above-identified patent and that said Letters Patent is hereby corrected as shown below:

In the Claims

Column 58, Claim 8, Line 28, Delete: "processor"

Column 60, Claim 23, Line 36, Delete: "19" and Insert: --18--

Signed and Sealed this
Fourth Day of November, 2025

John A. Squires
*Director of the United States Patent and Trademark Office*